(12) United States Patent
Katsuta et al.

(10) Patent No.: US 10,018,755 B2
(45) Date of Patent: Jul. 10, 2018

(54) LIGHT DIFFUSION MEMBER AND DISPLAY DEVICE

(71) Applicant: Sharp Kabushiki Kaisha, Osaka-shi, Osaka (JP)

(72) Inventors: Shohei Katsuta, Osaka (JP); Yasushi Asaoka, Osaka (JP); Hideomi Yui, Osaka (JP); Tsuyoshi Maeda, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 335 days.

(21) Appl. No.: 14/767,636

(22) PCT Filed: Feb. 24, 2014

(86) PCT No.: PCT/JP2014/054323
§ 371 (c)(1),
(2) Date: Aug. 13, 2015

(87) PCT Pub. No.: WO2014/132918
PCT Pub. Date: Sep. 4, 2014

(65) Prior Publication Data
US 2016/0018572 A1    Jan. 21, 2016

(30) Foreign Application Priority Data
Feb. 27, 2013    (JP) ................................. 2013-037538

(51) Int. Cl.
*G02F 1/1335*    (2006.01)
*G02B 5/02*    (2006.01)

(52) U.S. Cl.
CPC ......... *G02B 5/0247* (2013.01); *G02B 5/0242* (2013.01); *G02B 5/0278* (2013.01);
(Continued)

(58) Field of Classification Search
CPC ......... G02F 1/133504; G02F 1/133512; G02B 5/0247
See application file for complete search history.

(56) References Cited

U.S. PATENT DOCUMENTS

| | | | |
|---|---|---|---|
| 2006/0152943 A1* | 7/2006 | Ko | G02B 5/045 362/627 |
| 2014/0111862 A1* | 4/2014 | Yamamoto | G02F 1/133504 359/599 |

FOREIGN PATENT DOCUMENTS

| | | | | |
|---|---|---|---|---|
| JP | 2008-250163 A | 10/2008 | | |
| JP | WO 2012157512 A1 * | 11/2012 | ....... | G02F 1/133504 |
| WO | 2012/157517 A1 | 11/2012 | | |

OTHER PUBLICATIONS

Official Communication issued in International Patent Application No. PCT/JP2014/054323, dated Apr. 1, 2014.
(Continued)

Primary Examiner — Nathanael R Briggs
Assistant Examiner — Alexander Gross
(74) *Attorney, Agent, or Firm* — Keating & Bennett, LLP

(57) ABSTRACT

This light diffusion member includes: a substrate having light transmissivity; a plurality of light shielding layers formed on one face of the substrate; and light diffusion portions formed on the one face of the substrate at regions other than the regions where the light shielding layers have been formed. The light diffusion portions have a light-emitting end surface coming into contact with the substrate, a light incident end surface which faces the light-emitting end surface and has a larger area than the area of the light-emitting end surface, and a reflecting face coming into contact with the light-emitting end surface and the light incident end surface, and reflecting light entering from the light incident end surface. The height from the light incident end surface to the light-emitting end surface of the light (Continued)

diffusion portion is greater than the thickness of the light shielding layers. A scattering intensity at an azimuth $\phi_0+\Delta\phi$ and a scattering intensity at an azimuth $\phi_0-\Delta\phi$ across a strong scattering azimuth $\phi_0$ as a center axis are generally the same.

19 Claims, 27 Drawing Sheets

(52) U.S. Cl.
CPC .. *G02F 1/133504* (2013.01); *G02F 1/133512* (2013.01); *G02F 2001/133562* (2013.01)

(56) References Cited

OTHER PUBLICATIONS

Asaoka et al., "Roll-to-Roll Fabricated Self-alignment Microstructure Film for Improving the Viewing-angle characteristics of LCD", ISSN-L, IDW '13, FMCp-31L, Dec. 6, 2013, pp. 659-660.
Yamamoto et al., "Novel Microstructure Film for Improving Viewing Angle Characteristics of LCD", ISSN-L, IDW '13, LCT6-5L, Dec. 6, 2013, pp. 82-83.
Katsuta et al., "Optical Design of Novel Microstructure Film for Wide Viewing TN-LCD", ISSN-L, IDW '13, FMC8-5L, Dec. 6, 2013, pp. 562-563.

* cited by examiner

LIGHT DIFFUSION MEMBER AND DISPLAY DEVICE

TECHNICAL FIELD

The present invention relates to a light diffusion member and a display device.

The present application claims priority based on Japanese Patent Application No. 2013-037538 filed on Feb. 27, 2013, the entirety of which is incorporated by reference.

BACKGROUND ART

Liquid crystal display devices are in widespread use as displays for mobile electronic devices such as cellular phones and the like, televisions, personal computers, and so forth. Generally, liquid crystal display devices are known to have excellent visibility from the front, but to have a narrow viewing angle. Accordingly, various improvisations have been made to broaden the viewing angle. One such proposal is a configuration having a member to diffuse light emitted from the display such as a liquid crystal panel or the like (hereinafter referred to as light diffusion member), attached on the viewing side of the display.

For example, PTL 1 discloses a liquid crystal display device that has a liquid crystal panel, a backlight that casts light from the rear face side of the liquid crystal panel, and a light-scattering film disposed on the front side of the liquid crystal panel. The light-scattering film in the liquid crystal display device has a substrate having light transmissivity, and a light-scattering layer that is layered on one face of the substrate. This light-scattering layer is formed of a resin material in which scattering particles are dispersed.

CITATION LIST

Patent Literature

PTL 1: Japanese Unexamined Patent Application Publication No. 2008-250163

SUMMARY OF INVENTION

Technical Problem

Now, the liquid crystal display device described in PTL 1 has light emitted from the backlight side (rear face side) scattered at the light-scattering layer, so light is scattered over a wide angle range, and the viewing angle becomes wider. According to this configuration, the scattering properties of the light-scattering layer have anisotropy, so improvement in viewing angle properties can be anticipated. However, the scattering properties of the light-scattering layer having anisotropy may disturb the symmetry along a vertical axis of the light distribution properties which the liquid crystal panel initially has. The present Inventors have found that in this case, difference in light occurs at the left and right of the screen, and that horizontal viewing angle symmetry is impaired.

The present invention has been made to solve the above-described problem, and accordingly it is an object thereof to provide a light diffusion member which can maintain a horizontal symmetry of viewing angle while broadening the viewing angle. It is also an object to provide a liquid crystal display device with excellent display quality, that has the light diffusion member.

Solution to Problem

The following means have been employed in the present invention to achieve the above object.

(1) That is to say, a light diffusion member according to an aspect of the present invention includes: a substrate having light transmissivity; a plurality of light shielding layers formed on one face of the substrate; and light diffusion portions formed on the one face of the substrate at regions other than the regions where the light shielding layers have been formed. The light diffusion portions have a light-emitting end surface coming into contact with the substrate, a light incident end surface which faces the light-emitting end surface and has a larger area than the area of the light-emitting end surface, and a reflecting face coming into contact with the light-emitting end surface and the light incident end surface, and reflecting light entering from the light incident end surface. The height from the light incident end surface to the light-emitting end surface of the light diffusion portion is greater than the thickness of the light shielding layers. A scattering intensity at an azimuth $\phi_0+\Delta\phi$ and a scattering intensity at an azimuth $\phi_0-\Delta\phi$ across a strong scattering azimuth $\phi_0$ as a center axis are generally the same.

(2) In the light diffusion member according to (1), the light shielding layers may have major axes orthogonal to the center axis.

(3) In the light diffusion member according to (1), the plurality of light shielding layers may include a plurality of first light shielding layers having a major axis orthogonal to the center axis, a plurality of second light shielding layers having a major axis with an angle of $+\alpha$ as to the center axis, and a plurality of third light shielding layers having a major axis with an angle of $-\alpha$ as to the center axis. The shape and size of the second light shielding layers and the shape and size of the third light shielding layers are generally the same, and the number of the second light shielding layers and the number of the third light shielding layers are generally the same.

(4) In the light diffusion member according to (1), the plurality of light shielding layers may include a plurality of first light shielding layers having a major axis orthogonal to the center axis, a plurality of second light shielding layers having a major axis with an angle of $+\alpha$ as to the center axis, a plurality of third light shielding layers having a major axis with an angle of $-\alpha$ as to the center axis, a plurality of fourth light shielding layers having a major axis with an angle of $+\beta$ as to the center axis, and a plurality of fifth light shielding layers having a major axis with an angle of $-\beta$ as to the center axis. The shape and size of the second light shielding layers and the shape and size of the third light shielding layers are generally the same, and also the shape and size of the fourth light shielding layers and the shape and size of the fifth light shielding layers are generally the same. The number of the second light shielding layers and the number of the third light shielding layers are generally the same, and also the number of the fourth light shielding layers and the number of the fifth light shielding layers are generally the same.

(5) In the light diffusion member according to (1), the plurality of light shielding layers may include a plurality of first light shielding layers having a major axis orthogonal to the center axis, a plurality of second light shielding layers having a major axis with an angle of $+\alpha$ as to the center axis, a plurality of third light shielding layers having a major axis with an angle of $-\beta$ as to the center axis, and a plurality of fourth light shielding layers having a major axis with an angle of $-\gamma$ as to the center axis. The $\alpha$ satisfies the relationship of $\alpha=(\beta+\gamma)/2$. The shape and size of the second light shielding layers and the shape and size of the third light shielding layers and the shape and size of the fourth light shielding layers are generally the same. The number of the second light shielding layers, and the total of the number of the third light shielding layers and the number of the fourth light shielding layers, are generally the same.

(6) In the light diffusion member according to any one of (1) through (5), the planar shape of the light shielding layers seen from the normal direction of one face of the substrate may be an anisotropic shape having at least a major axis and a minor axis.

(7) In the light diffusion member according to (6), the planar shape of the light shielding layers seen from the normal direction of one face of the substrate may have biaxial symmetry.

(8) In the light diffusion member according to (7), the planar shape of the light shielding layers seen from the normal direction of one face of the substrate may be an ellipse, a rectangle, or a rhombus.

(9) The light diffusion member according to (1), the plurality of light shielding layers may include a plurality of first light shielding layers which have a major axis orthogonal to the center axis, and also where the planar shape of the light shielding layers is an isosceles triangle, and a plurality of second light shielding layers which have a major axis orthogonal to the center axis, and also where the planar shape of the light shielding layers is an isosceles triangle facing opposite to the first light shielding layers. The number of the first light shielding layers and the number of the second light shielding layers are generally the same.

(10) In the light diffusion member according to (1), the plurality of light shielding layers may include a plurality of first light shielding layers where the planar shape of the light shielding layers is circular, a plurality of second light shielding layers having a major axis with an angle of $+\alpha$ as to the center axis, and a plurality of third light shielding layers having a major axis with an angle of $-\alpha$ as to the center axis. The shape and size of the second light shielding layers and the shape and size of the third light shielding layers are generally the same, and the number of the second light shielding layers and the number of the third light shielding layers are generally the same.

(11) A light diffusion member according to a second aspect of the present invention includes: substrate having light transmissivity; a plurality of light diffusion portions formed on one face of the substrate; and a light shielding layer formed on the one face of the substrate at regions other than the regions where the light diffusion portions have been formed. The light diffusion portions have a light-emitting end surface coming into contact with the substrate, a light incident end surface which faces the light-emitting end surface and has a larger area than the area of the light-emitting end surface, and a reflecting face coming into contact with the light-emitting end surface and the light incident end surface, and reflecting light entering from the light incident end surface. The height from the light incident end surface to the light-emitting end surface of the light diffusion portion is greater than the thickness of the light shielding layer. A scattering intensity at an azimuth $\phi_0+\Delta\phi$ and a scattering intensity at an azimuth $\phi_0-\Delta\phi$ across a strong scattering azimuth $\phi_0$ as a center axis are generally the same.

(12) In the light diffusion member according to (11), the light diffusion portions may have major axes orthogonal to the center axis.

(13) In the light diffusion member according to (11), the plurality of light diffusion portions may include a plurality of first light diffusion portions having a major axis orthogonal to the center axis, a plurality of second light diffusion portions having a major axis with an angle of $+\alpha$ as to the center axis, and a plurality of third light diffusion portions having a major axis with an angle of $-\alpha$ as to the center axis. The shape and size of the second light diffusion portions and the shape and size of the third light diffusion portions are generally the same, and the number of the second light diffusion portions and the number of the third light diffusion portions are generally the same.

(14) In the light diffusion member according to (11), the plurality of light diffusion portions may include a plurality of first light diffusion portions having a major axis orthogonal to the center axis, a plurality of second light diffusion portions having a major axis with an angle of $+\alpha$ as to the center axis, a plurality of third light diffusion portions having a major axis with an angle of $-\alpha$ as to the center axis, a plurality of fourth light diffusion portions having a major axis with an angle of $+\beta$ as to the center axis, and a plurality of fifth light diffusion portions having an angle of $-\beta$ as to the center axis. The shape and size of the second light diffusion portions and the shape and size of the third light diffusion portions are generally the same, and also the shape and size of the fourth light diffusion portions and the shape and size of the fifth light diffusion portions are generally the same. The number of the second light diffusion portions and the number of the third light diffusion portions are generally the same, and also the number of the fourth light diffusion portions and the number of the fifth light diffusion portions are generally the same.

(15) In the light diffusion member according to (11), the plurality of light diffusion portions may include a plurality of first light diffusion portions having a major axis orthogonal to the center axis, a plurality of second light diffusion portions having a major axis with an angle of $+\alpha$ as to the center axis, a plurality of third light diffusion portions having a major axis with an angle of $-\beta$ as to the center axis, and a plurality of fourth light diffusion portions having a major axis with an angle of $-\gamma$ as to the center axis. The $\alpha$ satisfies the relationship of $\alpha=(\beta+\gamma)/2$. The shape and size of the second light diffusion portions and the shape and size of the third light diffusion portions and the shape and size of the fourth light diffusion portions are generally the same. The number of the second light diffusion portions, and the total of the number of the third light diffusion portions and the number of the fourth light diffusion portions, are generally the same.

(16) In the light diffusion member according to any one of (11) through (15), the planar shape of the light diffusion portions seen from the normal direction of one face of the substrate is an anisotropic shape having at least a major axis and a minor axis.

(17) In the light diffusion member according to (16), the planar shape of the light diffusion portions seen from the normal direction of one face of the substrate may have biaxial symmetry.

(18) In the light diffusion member according to (17), the planar shape of the light diffusion portions seen from the normal direction of one face of the substrate may be an ellipse, a rectangle, or a rhombus.

(19) In the light diffusion member according to (11), the plurality of light diffusion portions may include a plurality of first light diffusion portions which have a major axis orthogonal to the center axis, and also where the planar shape of the light diffusion portions is an isosceles triangle, and a plurality of second light diffusion portions which have a major axis orthogonal to the center axis, and also where the planar shape of the light diffusion portions is an isosceles triangle facing opposite to the first light diffusion portions. The number of the first light diffusion portions and the number of the second light diffusion portions are generally the same.

(20) In the light diffusion member according to (11), the plurality of light diffusion portions may include a plurality of first light diffusion portions where the planar shape of the light diffusion portions is circular, a plurality of second light diffusion portions having a major axis with an angle of +α as to the center axis, and a plurality of third light diffusion portions having a major axis with an angle of −α as to the center axis. The shape and size of the second light diffusion portions and the shape and size of the third light diffusion portions are generally the same. The number of the second light diffusion portions and the number of the third light diffusion portions are generally the same.

(21) A display device according to an aspect of the present invention includes: a display; and a viewing angle enlarging member that is disposed on a viewing side of the display and emits light in a state where an angle distribution of light input from the display is wider than that before input. The viewing angle enlarging member is configured including the light diffusion member according to any one of (1) to (20). Luminance distribution of the display is generally line-symmetric across a strong scattering azimuth φ of the light diffusion member as a center axis.

(22) In the display device according to (21), the display may be a liquid crystal panel including a pair of substrates, and a liquid crystal layer held between the pair of substrates.

(23) In the display device according to (22), a display mode of the liquid crystal panel may be twisted nematic mode or vertical alignment mode.

Advantageous Effects of Invention

According to the present invention, a light diffusion member can be provided which can maintain a horizontal symmetry of viewing angle while broadening the viewing angle. According to the present invention, a display device which has the above light diffusion member and has excellent display quality, can be provided.

DESCRIPTION OF EMBODIMENTS

First Embodiment

A first embodiment of the present invention will be described below with reference to FIG. 1 through FIG. 24.

The present embodiment will be described by way of an example of a liquid crystal display device having a transmissive liquid crystal panel as a display device.

Note that in all of the following drawings, the dimensional scale may vary among components, to facilitate viewing of the components.

Figure 1:
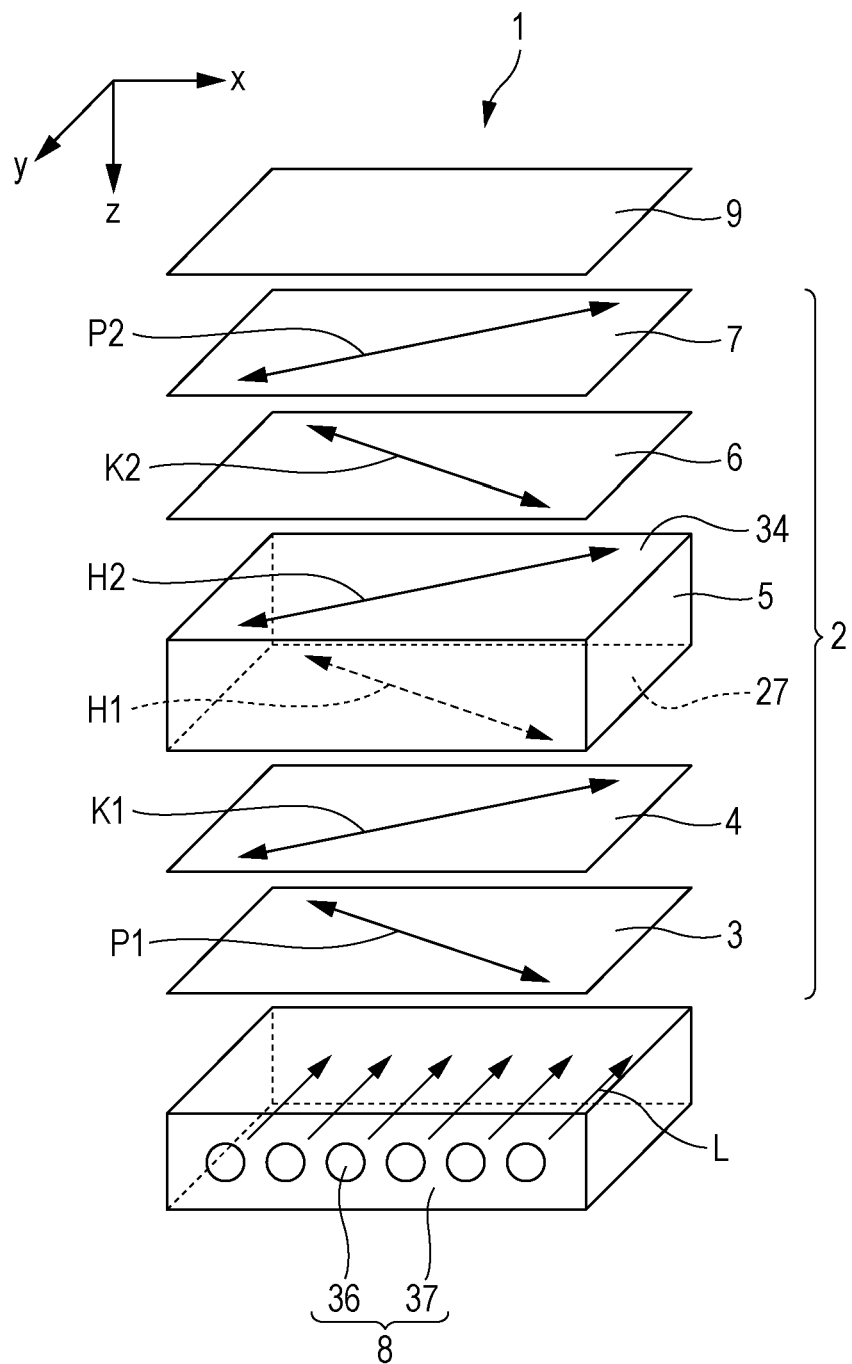
FIG. 1 is a perspective view illustrating a schematic configuration of a liquid crystal display device according to a first embodiment.
Figure 2:
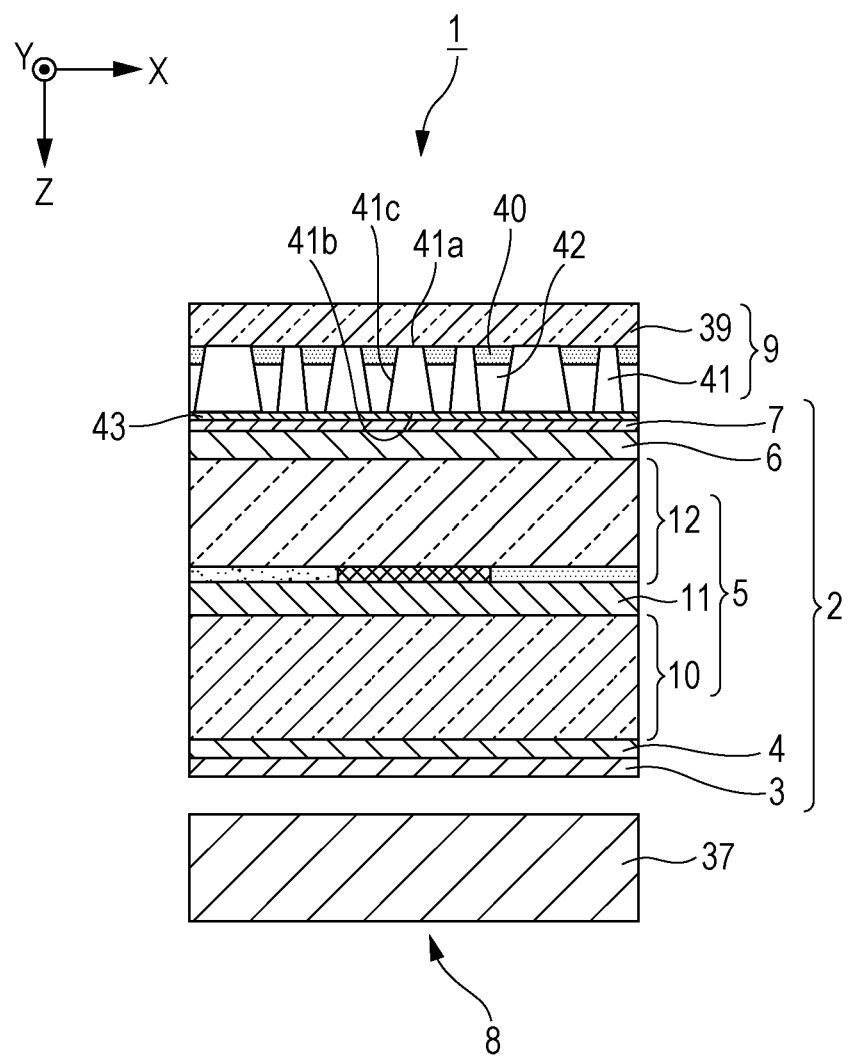
FIG. 2 is a cross-sectional diagram of the liquid crystal display device according to the first embodiment.

FIG. 1 is a perspective view a liquid crystal display device according to the present embodiment as viewed from obliquely above (viewing side). FIG. 2 is a cross-sectional diagram of the liquid crystal display device.

A liquid crystal display device 1 (display device) according to the present embodiment includes a liquid crystal panel 2 (display member), a backlight 8 (illumination device), and a light diffusion member 9 (viewing angle enlarging member), as illustrated in FIG. 1 and FIG. 2. The liquid crystal panel 2 includes a first polarizing plate 3, a first phase difference film 4 (phase difference plate), a liquid crystal cell 5, a second phase difference film 6 (phase difference plate), and a second polarizing plate 7. While FIG. 1 schematically illustrates the liquid crystal cell 5 as being a single plate, the detailed structure thereof will be described later.

An observer views a display from above the liquid crystal display device 1 in FIG. 1, where the light diffusion member 9 has been disposed. In the following description, the side where the light diffusion member 9 has been disposed will be referred to as the viewing side. The side where the backlight 8 has been disposed will be referred to as the rear face side. Also, in the following definition, the x axis is defined as a direction horizontal to the screen of the liquid crystal display device, the y axis as a direction perpendicular to the screen of the liquid crystal display device, and the z axis as the thickness direction of the liquid crystal display device.

Light emitted from the backlight 8 of the liquid crystal display device 1 according to the present embodiment is modulated at the liquid crystal panel 2, thereby displaying predetermined images, text, etc., by the modulated light. When the light emitted from the liquid crystal panel 2 passes through the light diffusion member 9, the light distribution of the emitted light is in a state of being broader than when entering the light diffusion member 9, and the light is emitted from the light diffusion member 9 in this state. Thus, the observer can view the display with a wide viewing angle.

The following is a description of a specific configuration of the liquid crystal panel 2.

Description will be made here by way of an example of an active matrix transmissive liquid crystal panel. It should be noted, however, that liquid crystal panels applicable to the present invention are not restricted to active matrix transmissive liquid crystal panels. Liquid crystal panels applicable to the present invention may be a transflective (both transmitting and reflecting) liquid crystal panel, for example. Further, this may be a simple matrix liquid crystal panel where the pixels do not have thin film transistors for switching (Thin Film Transistor, hereinafter abbreviated to TFT).

Figure 3:
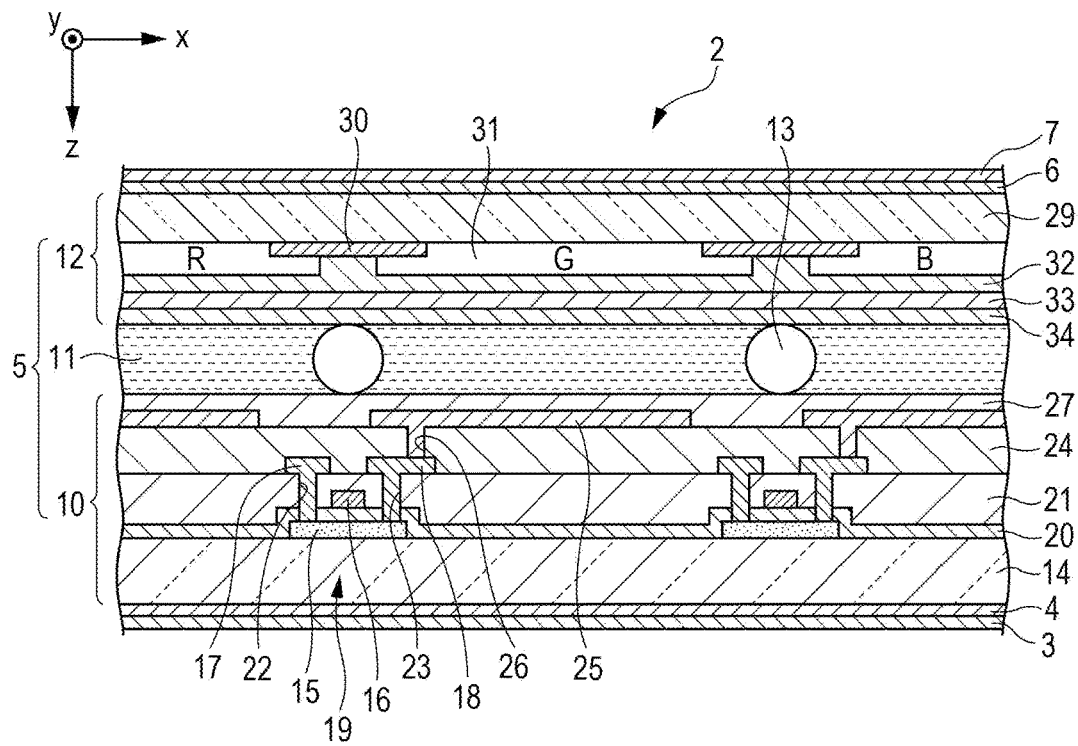
FIG. 3 is a longitudinal-section diagram of a liquid crystal panel.

FIG. 3 is a longitudinal-section diagram of a liquid crystal panel.

The liquid crystal cell 5 has a TFT substrate 10, a color filter substrate 12, and a liquid crystal layer 11, as illustrated in FIG. 3. The TFT substrate 10 functions as a switching device substrate. The color filter substrate 12 is disposed facing the TFT substrate 10. The liquid crystal layer 11 is interposed between the TFT substrate 10 and the color filter substrate 12.

The liquid crystal layer 11 is sealed in a space surrounded by the TFT substrate 10, the color filter substrate 12, and a frame-shaped seal member (not illustrated). The TFT substrate 10 and the color filter substrate 12 are bonded to each other across the seal member, with a predetermined spacing therebetween.

The liquid crystal panel 2 according to the present embodiment performs display in TN (Twisted Nematic) mode, for example.

Liquid crystal having positive dielectric anisotropy is used for the liquid crystal layer 11. Spacers 13 are disposed between the TFT substrate 10 and the color filter substrate 12. The spacers 13 are spherical or cylindrical. The spacers 13 serve to maintain the spacing between the TFT substrate 10 and the color filter substrate 12 constant.

The display mode of the liquid crystal panel 2 according to the present invention is not restricted to the above-described TN mode. For example, VA (Vertical Alignment) mode, STN (Super Twisted Nematic) mode, IPS (In-Plane Switching) mode, FFS (Fringe Field Switching) mode, or the like, may be used.

Although not illustrated, multiple pixels are arrayed on the TFT substrate 10 in matrix fashion.

A pixel is the smallest increment region of display. Multiple source bus lines are formed on the TFT substrate 10, extending parallel to each other. Multiple gate bus lines are formed on the TFT substrate 10, extending in parallel. The multiple gate bus lines are orthogonal to multiple source bus lines. The multiple source bus lines and multiple gate bus lines are formed in a lattice form on the TFT substrate 10. A rectangular region defined by adjacent source bus lines and adjacent gate bus lines is one pixel. A source bus line is connected to a source electrode 17 of a TFT 19. The gate bus line is connected to a gate electrode 16 of the TFT 19.

The face of a transparent substrate 14 making up the TFT substrate 10 facing toward the liquid crystal layer 11 has formed thereupon TFTs 19 having a semiconductor layer 15, gate electrode 16, source electrode 17, drain electrode 18, and so forth. A glass substrate may be used for the transparent substrate 14, for example.

The semiconductor layer 15 is formed above the transparent substrate 14. Semiconductor materials such as CGS (Continuous Grain Silicon), LPS (Low-temperature Poly-Silicon), α-Si (Amorphous Silicone), and so forth, are examples of materials used for the semiconductor layer 15.

A gate insulating film 20 is formed over the transparent substrate 14 so as to cover the semiconductor layer 15.

Examples of materials used for the gate insulating film 20 include silicon oxide films, silicon nitride films, layered films thereof, and so forth.

The gate electrode 16 is formed on the gate insulating film 20 facing the semiconductor layer 15. Examples of materials used for the gate electrode 16 include a layered film of W (tungsten)/TaN (tantalum nitride), Mo (molybdenum), Ti (titanium), Al (aluminum), and so forth.

The source electrode 17 and drain electrode 18 are formed above a first inter-layer insulating film 21. A contact hole 22 and a contact hole 23 are formed in the first inter-layer insulating film 21 and gate insulating film 20, passing through the first inter-layer insulating film 21 and gate insulating film 20.

The source electrode 17 is connected to a source region of the semiconductor layer 15 via the contact hole 22. The drain electrode 18 is connected to the drain region of the semiconductor layer 15 via the contact hole 23. A conductive material like that of the gate electrode 16 described above is used as the material for the source electrode 17 and the drain electrode 18.

A second inter-layer insulating film 24 is formed above the first inter-layer insulating film 21, so as to cover the source electrode 17 and the drain electrode 18. The material used for the second inter-layer insulating film 24 is a material like the first inter-layer insulating film 21 described above, or an organic insulating material.

A pixel electrode 25 is formed above the second inter-layer insulating film 24. A contact hole 26 is formed in the second inter-layer insulating film 24, passing through the second inter-layer insulating film 24. The pixel electrode 25 is connected to the drain electrode 18 via the contact hole 26. The pixel electrode 25 is connected to the drain region of the semiconductor layer 15 using the drain electrode 18 as a relay electrode.

A transparent conducting material such as ITO (Indium Tin Oxide), IZO (Indium Zinc Oxide), or the like, for example, is used as the material of the pixel electrode 25.

According to this configuration, when a scanning signal is supplied via the gate bus line and the TFT 19 goes on, an image signal supplied to the source electrode 17 via the source bus line is supplied to the pixel electrode 25 via the semiconductor layer 15 and drain electrode 18. An oriented film 27 is also formed on the entire face above the second inter-layer insulating film 24 so as to cover the pixel electrode 25. The oriented film 27 has an orientation restrictive force that causes the liquid crystal molecules making up the liquid crystal layer 11 to be aligned horizontally. The TFT 19 may be a top gate TFT illustrated in FIG. 3, or may be a bottom gate TFT.

On the other hand, a black matrix 30, a color filter 31, a planarizing layer 32, a counter electrode 33, and an oriented film 34, are sequentially formed of the liquid crystal layer 11 side of the transparent substrate making up the color filter substrate 12.

The black matrix 30 functions to shield transmission of light at inter-pixel regions. The black matrix 30 is formed of, for example, a metal such as Cr (chromium) or a multi-layer film of Cr/Cr oxide, or a photoresist where carbon particles are disposed in a photosensitive resin.

The color filter 31 includes pigments of the colors red (R), green (G), and blue (B). A color filter 31 of one of R, G, and B is disposed facing one pixel electrode 25 on the TFT substrate 10. The color filter 31 may have a multi-color configuration including the three colors of R, G, B, or more.

The planarizing layer 32 is configured using an insulating film covering the black matrix 30 and color filter 31. The planarizing layer 32 functions to reduce and smooth the steps formed by the black matrix 30 and color filter 31.

The counter electrode 33 is formed above the planarizing layer 32. A transparent conductive material the same as with the pixel electrode 25 is used as the material for the counter electrode 33.

The oriented film 34 is formed over the entire face above the counter electrode 33. This oriented film 34 has an orientation restrictive force that causes the liquid crystal molecules making up the liquid crystal layer 11 to be aligned horizontally.

Returning to FIG. 1, the backlight 8 is made up of a light source 36 and a light guide plate 37. The light source 36 is disposed on an edge face of the light guide plate 37. Examples of the light source 36 include a light-emitting diode, cold-cathode tube, or the like.

The backlight 8 according to the present embodiment is an edge light type backlight.

The light guide plate 37 functions to guide light emitted from the light source 36 to the liquid crystal panel 2. Examples of material of the light guide plate 37 include resin materials such as acrylic resin or the like.

Incident light to the edge face of the light guide plate 37 from the light source 36 is propagated through the inside of the light guide plate 37 while exhibiting total reflection, and is emitted from the upper face (light emission face) of the light guide plate 37 at a generally uniform intensity. A scattering sheet and prism sheet are disposed on the upper face of the light guide plate 37, although omitted from illustration. Light emitted from the upper face of the light guide plate 37 is scattered by the scattering sheet, and then collected by the prism sheet made generally parallel, and emitted. An example of the prism sheet is BEF (product name) manufactured by Sumitomo 3M.

The backlight 8 used in the present embodiment is a backlight that controls the emission direction of light, where the directionality is somewhat broadly set (hereinafter may be called a low-directional backlight). Luminance distribution of the low-directional backlight will be described later.

The first polarizing plate 3 is disposed between the backlight 8 and the liquid crystal cell 5. The first polarizing plate 3 functions as a polarizer. The angle here is expressed in a counterclockwise manner with the positive direction of the x axis as the reference. A transmission axis P1 of the first polarizing plate 3 is set in the 135°-315° direction.

The second polarizing plate 7 is disposed between the liquid crystal cell 5 and the light diffusion member 9. The second polarizing plate 7 functions as a polarizer. A transmission axis P2 of the second polarizing plate 7 is arranged so as to be orthogonal as to the transmission axis P1 of the first polarizing plate 3. The transmission axis P2 of the second polarizing plate 7 is set in the 45°-225° direction. The transmission axis P1 of the first polarizing plate 3 and the transmission axis P2 of the second polarizing plate 7 are in an arrangement of crossed Nicols.

The first phase difference film 4 is disposed between the first polarizing plate 3 and the liquid crystal cell 5. A phase lag axis K1 of the first phase difference film 4 is disposed orthogonally to the transmission axis P1 of the first polarizing plate 3. The phase lag axis K1 of the phase difference film 4 is set in the 45°-225° direction.

The second phase difference film 6 is disposed between the second polarizing plate 7 and the liquid crystal cell 5. A phase lag axis K2 of the second phase difference film 6 is disposed orthogonally to the transmission axis P2 of the second polarizing plate 7. The phase lag axis K2 of the phase difference film 6 is set in the 135°-315° direction.

WV film manufactured by Fuji Film is used as the phase difference films (first phase difference film 4 and second phase difference film 6) according to the present embodiment.

Next, the light diffusion member 9 will be described in detail.

The light diffusion member 9 includes a substrate 39, multiple light shielding layers 40, and a light diffusion portion 41, as illustrated in FIG. 2. The multiple light shielding layers 40 are formed on one face (the rear face of the viewing side) of the substrate 39. The light diffusion portion 41 is formed at a region of a face of the substrate 39 other than the regions where the light shielding layers 40 are formed.

The light diffusion member 9 is disposed on the second polarizing plate 7 assuming an attitude where the side on which the light diffusion portion 41 is provided faces toward the second polarizing plate 7 and the substrate 39 side facing toward the viewing side. The light diffusion member 9 is fixed to the second polarizing plate 7 by an adhesive agent layer 43.

A substrate made of a transparent resin such as triacetyl cellulose (TAC) film, polyethylene terephthalate (PET), poly carbonate (PC), polyethylene naphthalate (PEN), polyether sulfone (PES) film, or the like, for example, is preferably used for the substrate 39. The substrate 39 serves as a substrate on which to apply the materials for the light shielding layers 40 and light diffusion portion 41 later in the manufacturing process. The substrate 39 needs heat resistance and mechanical strength for the thermal treatment process in the manufacturing process. Accordingly, substrates such as glass or the like may be used for the substrate 39, besides resin substrates. However, the thickness of the substrate 39 is preferably thin, to the extent that the heat resistance and mechanical strength is not sacrificed. The reason is that the thicker the substrate 39 is, the greater the risk of blurred display is. Also, the total light transmittance of the substrate 39 preferably is 90% or higher, as stipulated by JIS K7361-1. Sufficient transparency can be obtained at total light transmittance of 90% or higher.

The present embodiment uses a transparent resin substrate having a thickness of 100 μm, as one example.

The light shielding layers 40 are disposed non-periodically as viewed from the normal direction of the principal face of the substrate 39. The light shielding layers 40 are configured using an organic material having light absorbency and photosensitivity, such as black resist, black ink, or the like, for example. Also, a metal film such as Cr (chromium) or a multi-layer film of Cr/Cr oxide or the like may be used.

The light diffusion portion 41 is configured using an organic material having light transmissivity and photosensitivity, such as acrylic resin, epoxy resin, or the like, for example. The total light transmittance of the light diffusion portion 41 preferably is 90% or higher, as stipulated by JIS K7361-1. Sufficient transparency can be obtained at total light transmittance of 90% or higher.

The light diffusion portion 41 includes a light-emitting end surface 41a, a light incident end surface 41b, and a reflecting face 41c. The light-emitting end surface 41a is a face in contact with the substrate 39. The light incident end surface 41b is a face facing the light-emitting end surface 41a. The reflecting face 41c is a tapered side face of the light diffusion portion 41. The reflecting face 41c is a face that reflects light input from the light incident end surface 41b. The area of the light incident end surface 41b is larger than the area of the light-emitting end surface 41a.

The light diffusion portion 41 is a portion which contributes to transmission of light in the light diffusion member 9. Incident light to the light diffusion portion 41 is guided therethrough being substantially enclosed within the light diffusion portion 41 while exhibiting total reflection at the reflecting face 41c of the light diffusion portion 41, and is emitted.

The light diffusion member 9 is disposed so that the substrate 39 faces the viewing side. Accordingly, the face with the smaller area of the two opposing faces of the light diffusion portion 41 is the light-emitting end surface 41a. On the other hand, the face with the larger area is the light incident end surface 41b.

An angle of inclination of the reflecting face 41c of the light diffusion portion 41 (the angle between the light incident end surface 41b and reflecting face 41c) preferably is 75° or greater but 85° or less. In the present embodiment, the inclination angle of the reflecting face 41c of the light diffusion portion 41 is 85°. Note however, that the inclination angle of the reflecting face 41c of the light diffusion portion 41 is not restricted in particular, as long as the incident light can be sufficiently diffused when emitting from the light diffusion member 9. The inclination angle of the reflecting face 41c of the light diffusion portion 41 is constant in the present embodiment.

The height from the light incident end surface 41b to the light-emitting end surface 41a of the light diffusion portion 41 is set so as to be larger than the thickness of the light shielding layer 40. In the case of the present embodiment, the thickness of the light shielding layer 40 is around 150 nm, for example. The height from the light incident end surface 41b to the light-emitting end surface 41a of the light diffusion portion 41 is 20 w, for example. A portion surrounded by the reflecting face 41c of the light diffusion portion 41 and the light shielding layers 40 is a hollow portion 42. Air is present in the hollow portion 42.

Figure 4:
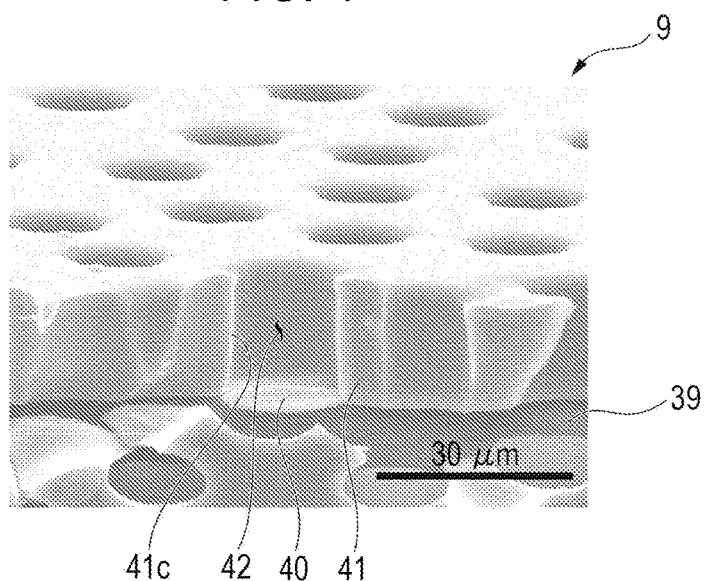
FIG. 4 is an SEM photograph of a light diffusion member according to the first embodiment.

FIG. 4 is an SEM photograph of the light diffusion member 9.

It can be seen in FIG. 4 that multiple hollow portions 42 are formed in the light diffusion member 9. The hollow portions 42 can be confirmed to be existing at portions surrounded by reflecting faces 41c of the light diffusion portion 41 and the light shielding layer 40.

Note that the refractive index of the substrate 39 and the refractive index of the light diffusion portion 41 is preferably generally equal. The reason is as follows. A case will be considered here the refractive index of the substrate 39 and the refractive index of the light diffusion portion 41 greatly differ, for example. In this case, unwanted refraction and reflection may occur at the interface of the light diffusion portion 41 and the substrate 39 when incident light from the light incident end surface 41b is emitted from the light diffusion portion 41.

There is a concern in this case that there may be trouble such as a desired viewing angle cannot be obtained, the quantity of emitted light decreases, and so forth.

Air is present in the hollow portion 42 (outside of the light diffusion portions 41) in the case of the present embodiment. Accordingly, if the light diffusion portion 41 is formed of a transparent acrylic resin for example, the reflecting face 41c of the light diffusion portion 41 is an interface of the transparent acrylic resin and the air. Now, the hollow portion 42 may be filled with another low-refractive-index material. However, the difference in refractive index at the interface of the inside and outside of the light diffusion portion 41 is greatest when air is present at the outside, as compared to a case with any low-refractive-index material.

Thus, according to Snell's law, the critical angle is the smallest according to the configuration of the present embodiment, and the incident angle range of total reflection of light at the reflecting face 41c of the light diffusion portion 41 is the largest. As a result, loss of light is suppressed, and a high level of luminance can be obtained.

Figure 5:
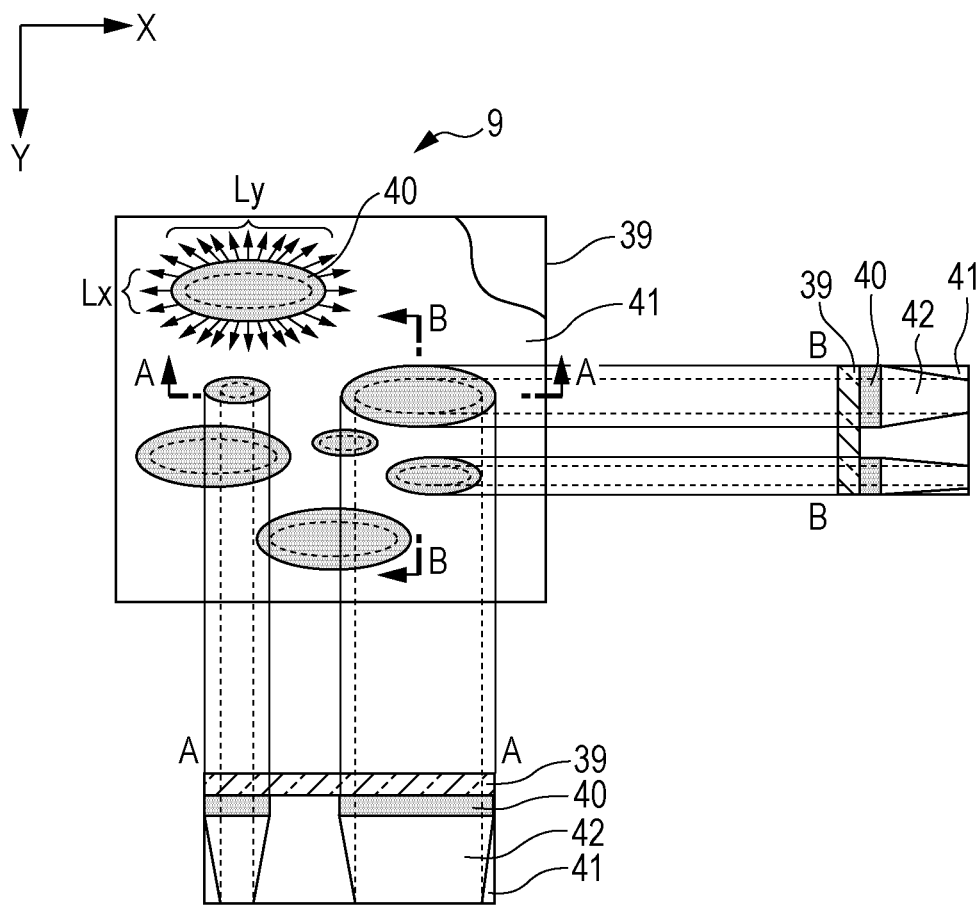
FIG. 5 is a plan view of a light diffusion member according to the first embodiment.

FIG. 5 is a schematic diagram of the light diffusion member 9. The upper left part of FIG. 5 is a plan view of the light diffusion member 9. The lower left part is a cross-sectional diagram taken along line A-A in the plan view to the upper left part. The upper right part is a cross-sectional diagram taken along line B-B in the plan view to the upper left part.

The light diffusion member 9 according to the present embodiment has multiple light shielding layers 40 provided, scattered throughout the substrate 39, as illustrated in the upper left part in FIG. 5. The light shielding layers 40 are slender ovals in planar shape as viewed from the normal direction of the substrate 39. The light shielding layers 40 each have a major axis and a minor axis. The major axis here is the longest axis in the planar shape of the light shielding layer 40 as viewed from the normal direction of the substrate 39. The minor axis is the shortest axis in the planar shape of the light shielding layer 40 as viewed from the normal direction of the substrate 39. The ratio of the length of the minor axis as to the length of the major axis in the light shielding layers 40 is generally equal in the light diffusion member 9 according to the present embodiment.

The area of the region where the light shielding layer 40 is formed as viewed from the normal direction of the substrate 39 will be denoted by S1. The area of one face of the substrate 39 is S2. The ratio S1/S2 of the formation region area of the light shielding layer 40, S1, and the area of one face of the substrate 39, S2, is 0.1 or larger by 0.4 or smaller. Now, the formation region area of the light shielding layer 40 is the area of all of the multiple formation regions of the light shielding layer 40 scattered over the face of the substrate 39 added together. Note that in the following description, the ratio S1/S2 of the formation region area of the light shielding layer 40, S1, and the area of one face of the substrate 39, S2, may simply be referred to as the area ratio of the formation region area of the light shielding layer 40. In the present embodiment, the ratio S1/S2 of the formation region area of the light shielding layer 40 is 0.3.

The portions equivalent to below the light shielding layers 40 are the hollow portions 42 that are elliptical frustums, as illustrated at the lower left and upper right in FIG. 5. The light diffusion member 9 has multiple hollow portions 42. The light diffusion portions 41 are arrayed continuously other than where the multiple hollow portions 42 are present.

The major axis direction of the ellipses making of the planar shape of the light shielding layers 40 (hereinafter may also be referred to as major axis direction of shielding layer) are generally arranged in the X direction in the light diffusion member 9 according to the present embodiment. The minor axis direction of the ellipses making of the planar shape of the light shielding layers 40 (hereinafter may also be referred to as minor axis direction of shielding layer) are generally arranged in the Y direction. Accordingly, taking the orientation of the reflecting faces 41c of the light diffusion portions 41 into consideration, the percentage of the reflecting faces 41c following the X direction is greater than the percentage of the reflecting faces 41c following the Y direction in the reflecting faces 41c of the light diffusion portions 41. Thus, the amount of light Ly reflecting off of the reflecting face 41c following the X direction and diffusing in the Y direction is greater than the amount of light Lx reflecting off of the reflecting face 41c following the Y direction and diffusing in the X direction. Accordingly, the azimuthal direction where the diffusion at the light diffusion member 9 is the strongest is the Y direction, which is the minor axis direction of the light shielding layers 40.

Figure 6:
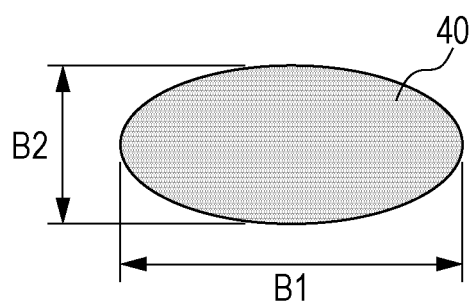
FIG. 6 is a diagram for describing the relationship between the shape and dimensions of the light-shielding layer according to the first embodiment in planar view.

FIG. 6 is a diagram for describing the relationship between the shape and dimensions of the light shielding layer 40 in plan view.

FIG. 6 is a plan view illustrating one light shielding layer 40 out of the multiple light shielding layers 40.

The length of the light shielding layer 40 in the major axis direction is denoted by B1, as illustrated in FIG. 6. The length of the light shielding layer 40 in the minor axis direction is denoted by B2. The ratio B1/B2 of the length B1 in the major axis direction and length B2 in the minor axis direction of the light shielding layer 40 is desirably 1.1 or larger but 2.5 or smaller.

The length B1 of the light shielding layer 40 in the major axis direction is 20 μm in the present embodiment. The length B2 of the light shielding layer 40 in the minor axis direction is 10 μm. The ratio B1/B2 of the length B1 in the major axis direction and length in B2 the minor axis direction of the light shielding layer 40 is 2.

Returning to FIG. 1, the orientation control direction of the oriented film 27 of the TFT substrate 10 is indicated by an arrow H1. On the other hand, the orientation control direction of the oriented film 34 of the color filter substrate 12 is indicated by an arrow H2.

The oriented film 27 has been subjected to orientation processing such as rubbing or the like, so that the orientation control direction H1 is the 135°-315° direction. On the other hand, the oriented film 34 has been subjected to orientation processing such as rubbing or the like, so that the orientation control direction H2 is the 45°-225° direction.

Figure 7A:
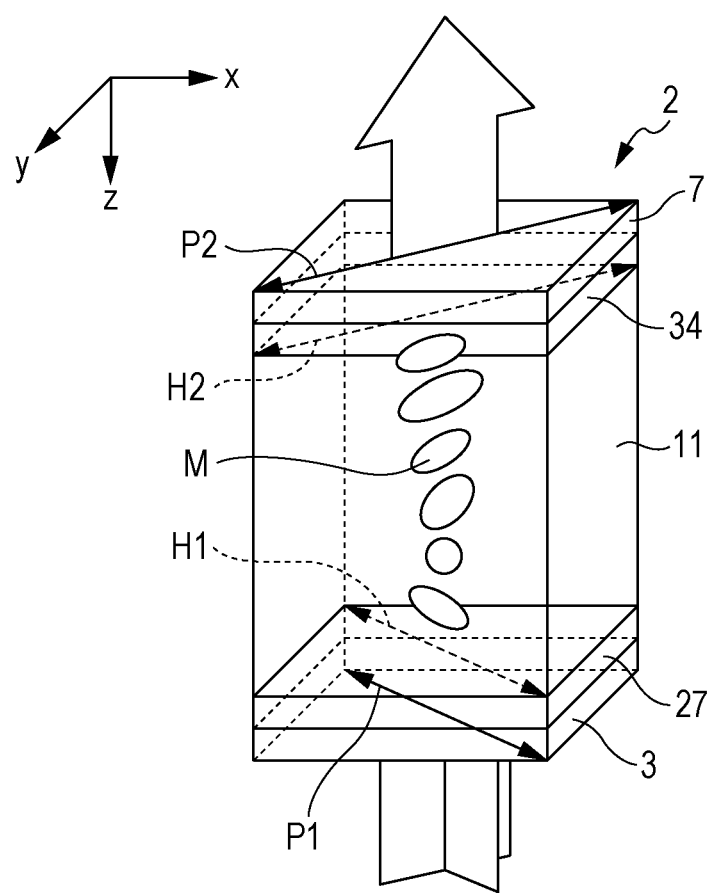
FIG. 7A is a diagram for describing effects of the liquid crystal panel.
Figure 7B:
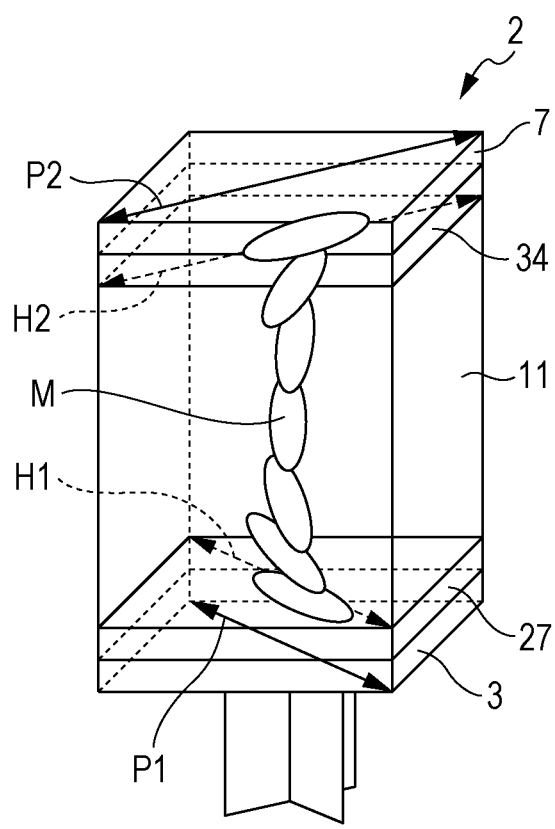
FIG. 7B is a diagram for describing effects of the liquid crystal panel.

FIG. 7A and FIG. 7B are diagrams to describe the effects of the liquid crystal panel 2.

FIG. 7A is a diagram illustrating the state of the liquid crystal panel 2 when no voltage is applied (voltage non-application state) to the liquid crystal panel 2 (between the pixel electrode 25 and counter electrode 33 illustrated in FIG. 3). FIG. 7B is a diagram illustrating the state of the liquid crystal panel 2 when a certain voltage is applied (voltage application state) to the liquid crystal panel 2. Note that illustration of the first phase difference film 4 and the second phase difference film 6 will be omitted from FIG. 7A and FIG. 7B for sake of convenience. The symbol M represents liquid crystal molecules making up the liquid crystal layer 11.

In the voltage non-application state illustrated in FIG. 7A, the liquid crystal molecules M are in a 90° twisted state between the oriented film 27 and the oriented film 34. At this time, the plane of polarization of linearly polarized light passing through the first polarizing plate 3 having the transmission axis P1 in the 135°-315° direction rotates 90° due to the optical rotation properties of the liquid crystal layer 11. Accordingly, the linearly-polarized light which has passed through the first polarizing plate 3 passes through the second polarizing plate 7 having the transmission axis P2 in the 45°-225° direction (LP1). Consequently, in the voltage non-application state, the display is white.

In the voltage application state illustrated in FIG. 7B, the liquid crystal molecules M are in an erect state following the direction of the electric field between the oriented film 27 and the oriented film 34. At this time, the plane of polarization of linearly polarized light passing through the first polarizing plate 3 having the transmission axis P1 in the 135°-315° direction does not rotate. Accordingly, the linearly-polarized light which has passed through the first polarizing plate 3 does not pass through the second polarizing plate 7 having the transmission axis P2 in the 45°-225° direction. Consequently, in the voltage application state, the display is black.

As described above, white display and black display can be switched by controlling application/non-application of voltage to each pixel, and thus an image can be displayed.

Figure 8:
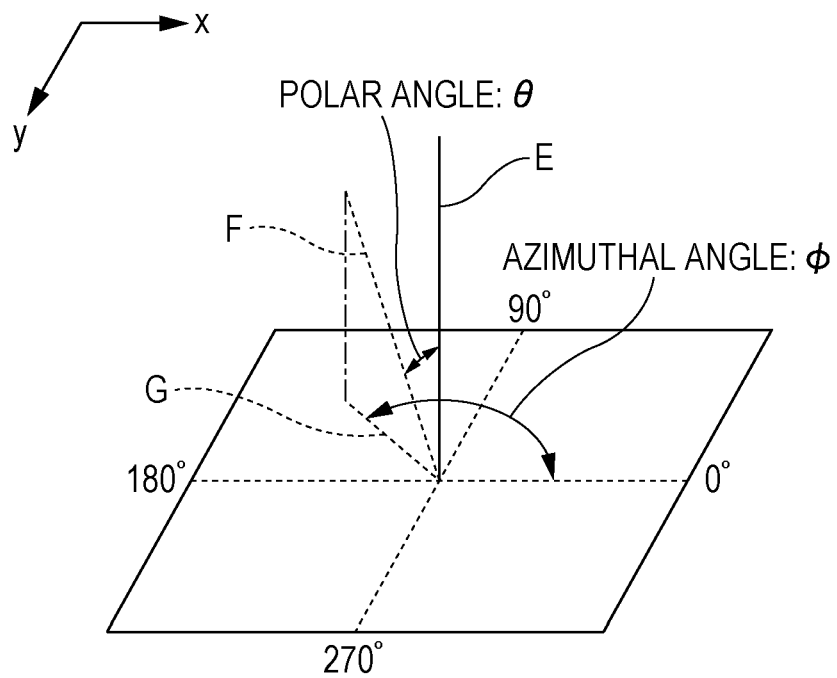
FIG. 8 is a diagram for describing definitions of polar angle and azimuthal angle.

FIG. 8 is a diagram for describing the definition of the polar angle and azimuthal angle.

As illustrated in FIG. 8, an angle between a normal direction E of the screen of the liquid crystal display device 1, serving as a reference, and a viewing direction F of an observer, is the polar angle θ here. An angle between the positive direction on the x axis (direction 0°) serving as a reference and the direction of a line segment G obtained by projecting the viewing direction F of the observer on the screen, is the azimuthal angle ϕ.

Figure 9:
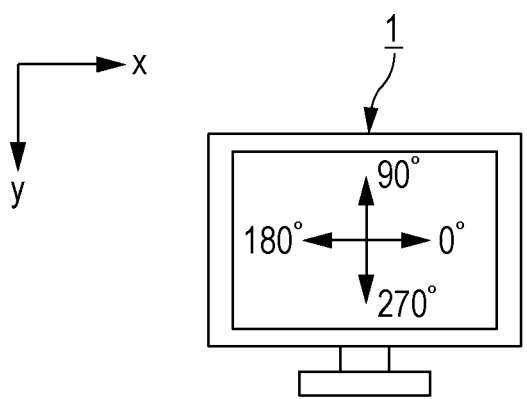
FIG. 9 is a frontal view of a liquid crystal display device.

FIG. 9 is a frontal view of the liquid crystal display device 1.

The horizontal direction (x-axis direction) of the screen of the liquid crystal display device 1 is the direction of azimuthal angle ϕ 0°-180°, as illustrated in FIG. 9. The direction of azimuthal angle ϕ 0°-180° is, simply stated, the horizontal direction. Specifically, the direction of azimuthal angle ϕ 0°-180° is a direction following an axis parallel to the ground. The vertical direction (y-axis direction) is the direction of azimuthal angle ϕ 90°-270°. Simply put, the direction of azimuthal angle ϕ 90°-270° is the up-and-down direction. Specifically, the direction of azimuthal angle ϕ 90°-270° is a direction following an axis perpendicular to the ground.

Figure 10:
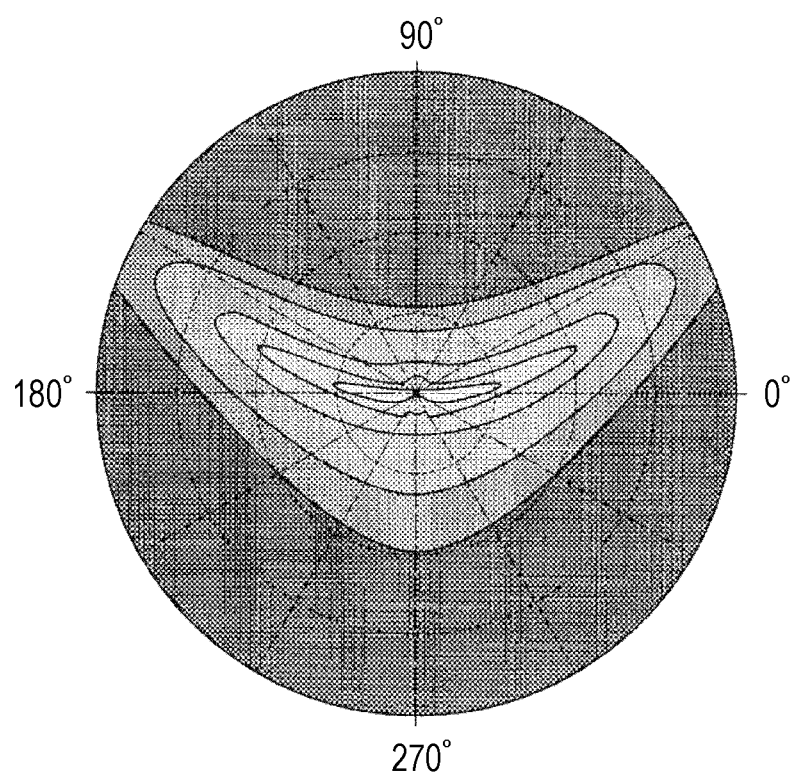
FIG. 10 is a diagram illustrating contrast viewing angle properties in a liquid crystal panel.

FIG. 10 is a diagram illustrating iso-contrast curves representing contrast viewing angle properties when displaying white with the liquid crystal panel 2 according to the present embodiment. With the azimuthal angle directions illustrated in FIG. 8 defined, the iso-contrast curves are as illustrated in FIG. 10. The five iso-contrast curves have a higher contrast ratio the further outward as compared to inward.

Note that contrast ratio is a white display luminance value/black display luminance value in a display image. The greater the contrast ratio is, the better the visual recognition of the displayed image can be determined to be.

The following configuration has been employed in the present embodiment so that a state of good visual recognition of the displayed image can be maintained even if the displayed image is observed from the azimuthal angle ϕ: 270° direction side.

Figure 11:
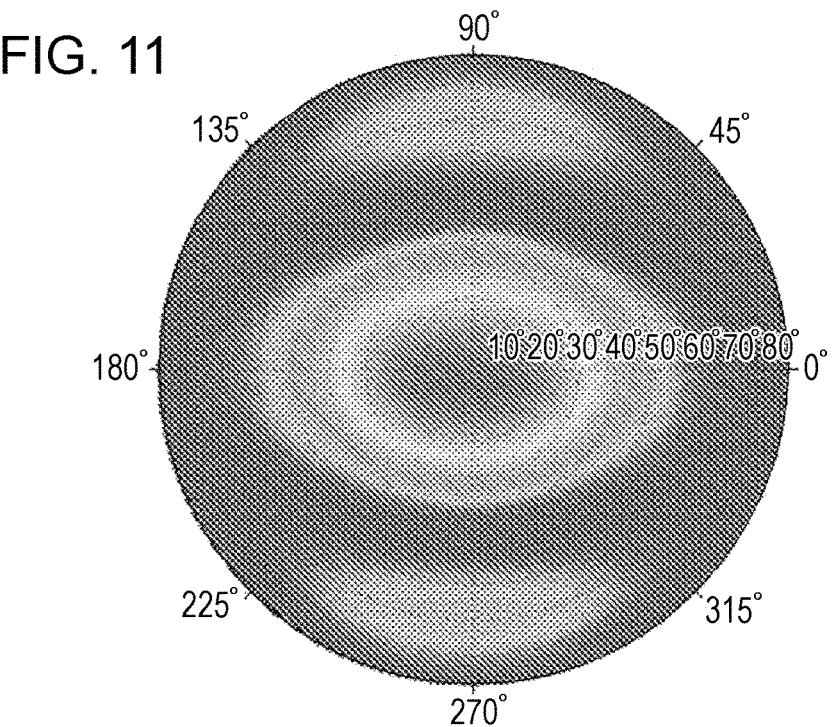
FIG. 11 is a diagram illustrating polar angle luminance properties of a low-directionality backlight using isophote curves.

FIG. 11 is a diagram illustrating polar angle luminance properties of the backlight 8 in the liquid crystal display device 1 according to the present embodiment (low-directionality backlight) using isophote curves.

Figure 12:
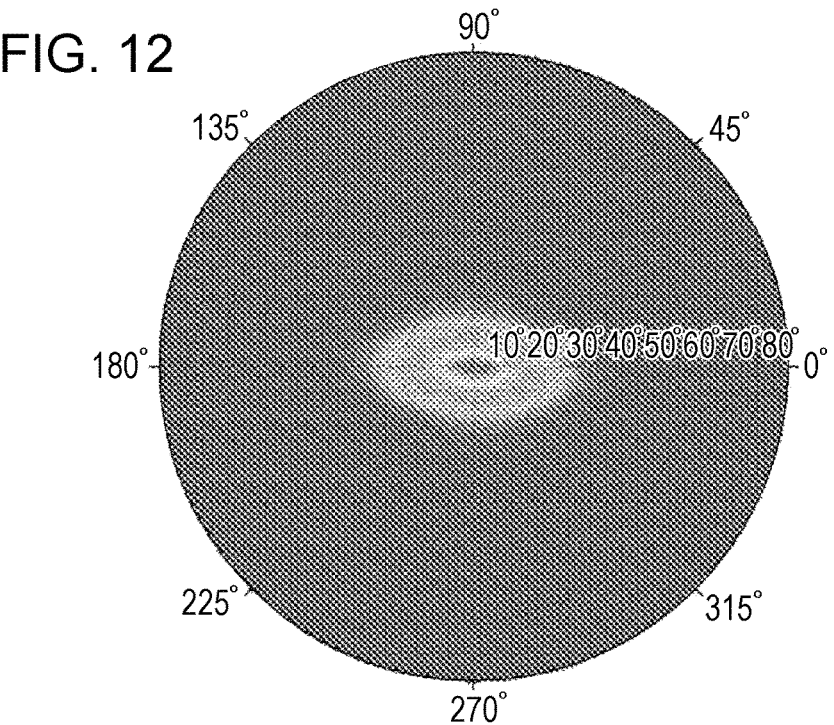
FIG. 12 is a diagram illustrating polar angle luminance properties of a directional backlight using isophote curves.

FIG. 12 is a diagram illustrating polar angle luminance properties of a high-directionality backlight using isophote curves.

Figure 13:
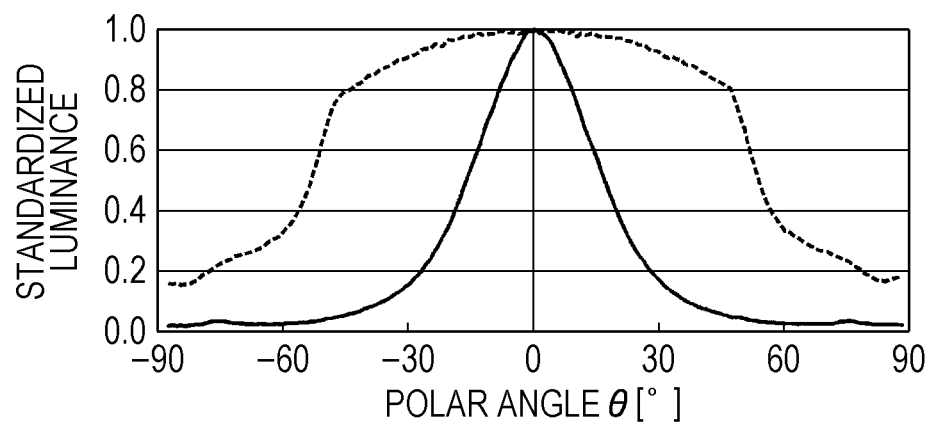
FIG. 13 is a diagram illustrating polar angle luminance properties of a backlight at azimuthal angle φ: 0°-180° using polar coordinates.

FIG. 13 is a diagram illustrating polar angle luminance distribution at an azimuthal angle ϕ 0°-180° direction by polar coordinates, with regard to the isophote curves illustrated in FIG. 11 and FIG. 12.

Figure 14:
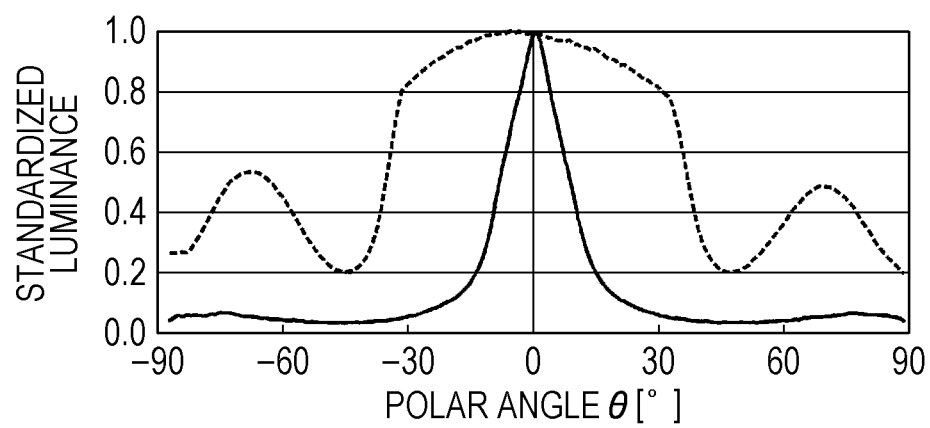
FIG. 14 is a diagram illustrating polar angle luminance properties of a backlight at azimuthal angle φ: 90°-270° using polar coordinates.

FIG. 14 is a diagram illustrating polar angle luminance properties at an azimuthal angle ϕ 90°-270° direction by polar coordinates, with regard to the isophote curves illustrated in FIG. 11 and FIG. 12.

In FIG. 13 and FIG. 14, the horizontal axis is polar angle θ[°], and the vertical axis is a standardized luminance where the display luminance in the frontal direction is represented by 1.

As described above, the backlight 8 according to the present embodiment is a low-directionality backlight where the emission direction of light is controlled and directionality is somewhat broadly set. FIG. 11 is the luminance distribution of this low-directionality backlight that has been visualized using azimuthal angle ϕ.

In the azimuthal angle ϕ 0°-180° direction, an angle range where the luminance is high is relatively broad, as illustrated in FIG. 11 and FIG. 13. On the other hand, in the azimuthal angle ϕ 90°-270° direction, an angle range where the luminance is high is relatively narrow, as illustrated in FIG. 11 and FIG. 14. That is to say, the change in luminance of the backlight 8 is the smallest in the azimuthal angle ϕ 0°-180° direction. On the other hand, the change in luminance of the backlight 8 in the polar angle direction is the largest in the azimuthal angle φ 90°-270° direction.

Now, the "azimuthal angle direction where the change in luminance of the polar angle direction of the backlight 8 is the largest" will be the direction in which the inclination of the curve is large, in the measurement/illustration of the polar angle/luminance curve in each azimuthal angle.

The "azimuthal angle direction where the change in luminance of the polar angle direction of the backlight 8 is the smallest" will be the direction in which the inclination of the curve is small, in the measurement/illustration of the polar angle/luminance curve in each azimuthal angle.

The "azimuthal angle direction where the transmissivity change in polar angle direction is largest in a case where a constant voltage is applied to the liquid crystal panel 2" in TN arrangements will be referred to as "clear vision direction". In one-division orientation and two-division orientation VA arrangements, this will be a direction perpendicular to the direction in which the director tilts". Note that the director is direction of the principal orientation (the direction in which the long molecular axes of the nematic crystal are averagely arrayed.

The "azimuthal angle direction where the change in luminance of the polar angle direction of the backlight 8 is the largest" in the present embodiment is the azimuthal angle φ 90°-270° direction.

The "azimuthal angle direction where the change in luminance of the polar angle direction of the backlight 8 is the smallest" is the azimuthal angle φ 0°-180° direction.

The "azimuthal angle direction where the transmissivity change in polar angle is the largest in a case where a constant voltage is applied to the liquid crystal panel 2" is the azimuthal angle φ 90°-270° direction.

The azimuthal angle direction where the change in luminance of the polar angle direction of the backlight 8 is the largest (azimuthal angle φ: 90°-270° direction) and the azimuthal angle direction where the transmissivity change in polar angle is the largest in a case where a constant voltage is applied to the liquid crystal panel 2 (azimuthal angle φ: 90°-270° direction) are generally matched in the present embodiment.

Note that the azimuthal angle direction where the change in luminance of the polar angle direction of the backlight 8 is the largest and the azimuthal angle direction where the transmissivity change in polar angle is the largest in a case where a constant voltage is applied to the liquid crystal panel 2 do not have to completely match; it is sufficient to generally match. In a general liquid crystal display device assembly process, the rotational misalignment of positioning between the liquid crystal panel and the backlight is considered to be within around 5°. Accordingly, the azimuthal angle direction where the change in luminance of the polar angle direction of the backlight 8 is the largest and the azimuthal angle direction where the transmissivity change in polar angle is the largest in a case where a constant voltage is applied to the liquid crystal panel 2 may be misaligned by around 5°.

The light diffusion member 9 is disposed on the light-emitting side of the liquid crystal panel 2, as illustrated in FIG. 1 and FIG. 2. In the present embodiment, the azimuthal angle direction where the diffusion of the light diffusion member 9 is the strongest (the direction Y in FIG. 5, which is the minor axis direction of the light shielding layers 40) and the azimuthal angle direction where the transmissivity change in polar angle direction of the light diffusion member 9 is the largest in a case where a constant voltage is applied to the liquid crystal panel 2 (azimuthal angle φ: 90°-270° direction) are generally matched.

Note that the azimuthal angle direction where the diffusion of the light diffusion member 9 is the strongest and the azimuthal angle direction where the transmissivity change in polar angle direction of the light diffusion member 9 is the largest in a case where a constant voltage is applied to the liquid crystal panel 2 do not have to completely match; it is sufficient to generally match. In a general liquid crystal display device assembly process, the rotational misalignment of positioning between the liquid crystal panel and the light diffusion member is considered to be within around 5°. Accordingly, the azimuthal angle direction where the diffusion of the light diffusion member 9 is the strongest and the azimuthal angle direction where the transmissivity change in polar angle of the light diffusion member 9 is the largest in a case where a constant voltage is applied to the liquid crystal panel 2 may be misaligned by around 5°.

The present Inventors compared gradient luminance properties between the liquid crystal display device 1 according to the present embodiment and a liquid crystal display device according to a comparative example, to verify the effects of the liquid crystal display device 1 according to the present embodiment. The liquid crystal display device according to the comparative example and the liquid crystal display device 1 according to the present embodiment were subjected to simulation, and polar angle luminance properties were confirmed. Light Tools was used for the simulation software.

Figure 15:
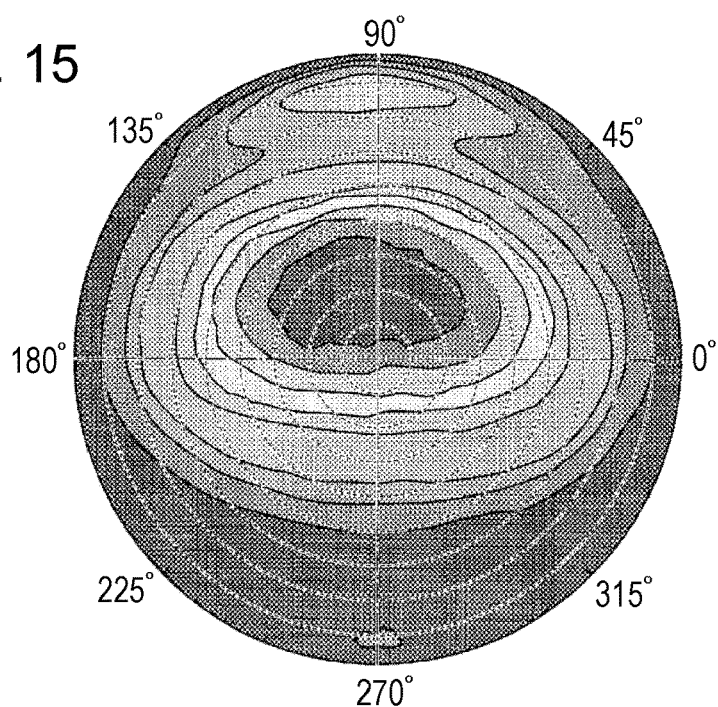
FIG. 15 is a diagram illustrating polar angle luminance properties using a liquid crystal device according to a comparative example.
Figure 16:
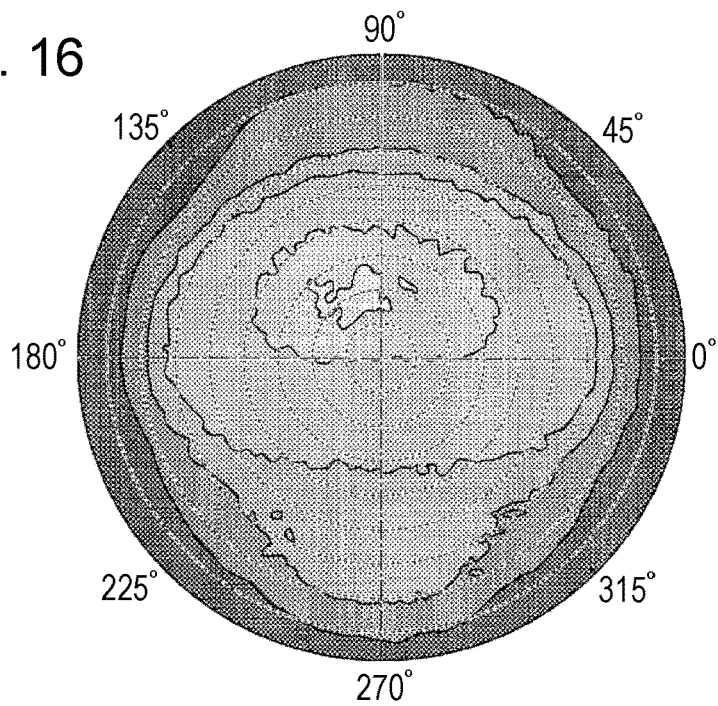
FIG. 16 is a diagram illustrating polar angle luminance properties using a liquid crystal device according to the first embodiment.

FIG. 15 shows isophote curves in a case of using the liquid crystal display device according to the comparative example. FIG. 16 shows isophote curves in a case of using the liquid crystal display device 1 according to the first embodiment. Now, the liquid crystal display device according to the comparative example does not have a light diffusion member. The backlight is a low-directionality backlight. The liquid crystal display device according to the comparative example is equivalent to the liquid crystal display device 1 according to the present embodiment with the light diffusion member 9 omitted.

Neither the liquid crystal display device according to the comparative example nor the liquid crystal display device 1 according to the present embodiment exhibit inversion of gradient or poor gradation reproduction in the azimuthal angle φ: 0°-180° direction (horizontal direction of the screen), as illustrated in FIG. 15 and FIG. 16.

However, the liquid crystal display device according to the comparative example exhibits poor gradation reproduction in the azimuthal angle φ: 90°-270° direction (vertical direction of the screen), as illustrated in FIG. 15.

In comparison with this, the liquid crystal display device according to the present embodiment exhibits neither inversion of gradient nor poor gradation reproduction in the azimuthal angle φ: 90°-270° direction (vertical direction of the screen), as illustrated in FIG. 16.

Accordingly, it can be seen that by disposing a light diffusion member to anisotropically diffuse light, and generally matching the azimuthal angle direction where the transmissivity change in the polar angle direction of the light diffusion member is largest in a case of applying a constant voltage to the liquid crystal panel with the azimuthal angle direction where the diffusion of the light diffusion member is the strongest, occurrence of inversion of gradation and poor gradation reproduction can be suppressed.

Now, imparting anisotropy to scattering properties of the light diffusion member to increase the effects of improved viewing angle properties may disturb horizontal symmetry in the original light distribution properties of the liquid crystal panel in some cases. It has been found through study by the present Inventors that in such cases, difference occurs in the brightness of the screen between the right and left, and symmetry of viewing angle in the horizontal direction is lost.

Accordingly, the present embodiment employs the following configuration, so that symmetry of viewing angle in the horizontal direction can be maintained. Specifically, the scattering intensity at azimuth $\phi_0+\Delta\phi$ and the scattering intensity at azimuth $\phi_0-\Delta\phi$ across a strong scattering azimuth $\phi_0$ as a center axis are made to be generally equal at the light diffusion member 9. The luminance distribution of the liquid crystal panel 2 is generally linearly symmetrical in the liquid crystal display device 1.

Note that "strong scattering azimuth $\phi_0$" is defined such that when a scattering intensity $I_\phi$ is plotted as to azimuthal angle $\phi$, the azimuthal angle $\phi$ of which the scattering intensity $I\phi$ assumes the peak value is the strong scattering azimuth $\phi_0$.

Figure 17:
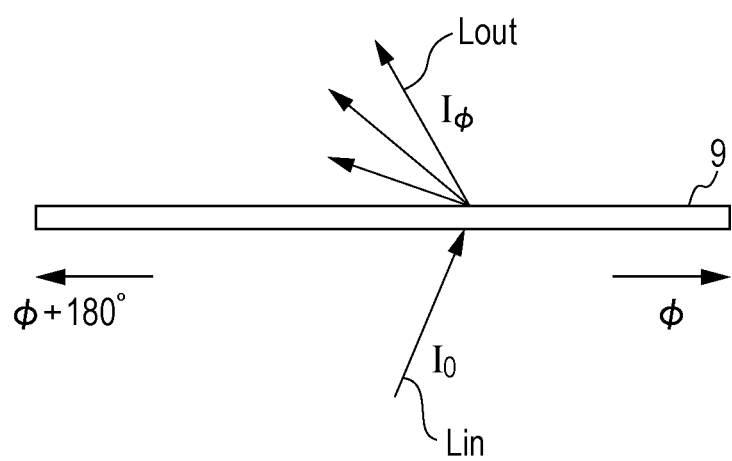
FIG. 17 is a diagram for describing scattering intensity.

FIG. 17 is a diagram for describing scattering intensity 10.

As illustrated in FIG. 17, "strong scattering azimuth $\phi_0$" is defined such that when there is incident light $L_{in}$ having intensity $I_0$, to the light diffusion member 9 from an optional azimuthal angle $\phi$ and an optional polar angle $\theta$, the cumulative intensity of light $L_{out}$ emitted in a range of polar angle $\theta$: $0°\le\theta 60°$ in the azimuthal angle $\phi$: $\phi-(\phi+180°)$ direction is the scattering intensity $I_\phi$.

Figure 18A:
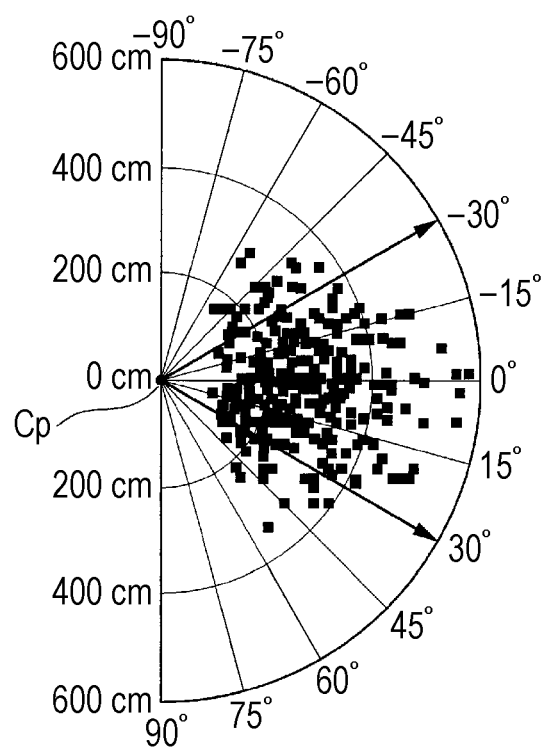
FIG. 18A is a diagram for describing viewing angle in a general display.
Figure 18B:
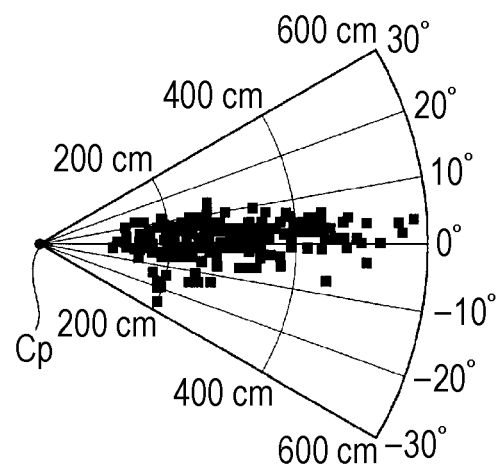
FIG. 18B is a diagram for describing viewing angle in a general display.

FIG. 18A and FIG. 18B are diagrams for describing viewing angle in a general display. A general display here includes a CRT (Cathode Ray Tube), an LCD (Liquid Crystal Display), and a PDP (Plasma Display Panel)

FIG. 18A is a diagram of scattering distribution of light emitted from the center Cp of a display erected vertically, viewed from a top view. FIG. 18B is a diagram of scattering distribution of light emitted from the center Cp of the display erected vertically, viewed from a side view.

The scattering distribution of light emitted from the center Cp of the display is situated within the range of polar angle $\theta$: $-60°\le\theta\le60°$ in top view, and particularly is situated in a concentrated manner within the range of polar angle $\theta$: $-30°\le\theta\le30°$, as illustrated in FIG. 18A.

The scattering distribution of light emitted from the center Cp of the display is situated within the range of polar angle $\theta$: $-30°\le\theta\le30°$ in side view, and particularly is situated in a concentrated manner within the range of polar angle $\theta$: $-10°\le\theta\le10°$, as illustrated in FIG. 18B.

It can be confirmed from these scattering distributions that the viewing angle of the display is within the range of polar angle $\theta$: $-60°\le\theta\le60°$. Accordingly, when defining the scattering intensity $I_\phi$, the cumulative intensity of light $L_{out}$ emitted in the range of polar angle $\theta$: $0°\le\theta\le60°$ is used.

Figure 19:
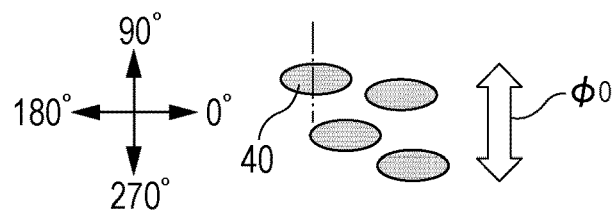
FIG. 19 is a diagram for describing a placement configuration of light shielding layers as to a strong scattering azimuth in the first embodiment.

FIG. 19 is a diagram for describing a placement configuration of the light shielding layers 40 as to a strong scattering azimuth in the present embodiment. Only part of the multiple light shielding layers 40 are illustrated in FIG. 19, for the sake of convenience.

In a case where the planar shape of the light shielding layer 40 is elliptical, the horizontal shapes of the ellipse are equal across the minor axis as an axis of symmetry, since ellipses have biaxial symmetry, as illustrated in FIG. 19. Accordingly, scattering properties are horizontally symmetrical across the strong scattering azimuth $\phi_0$ as the axis. Thus, the direction parallel with the minor axis is the strong scattering azimuth $\phi_0$ in the light shielding layer 40 where the planar shape is an ellipse.

The light shielding layer 40 according to the present embodiment has a major axis orthogonal to the center axis where the strong scattering azimuth $\phi_0$ is the center axis. The major axes of the multiple light shielding layers 40 are aligned in the same direction.

Note that the major axes of the multiple light shielding layers 40 do not each need to be arrayed completely aligned in the same direction; generally matching will suffice. Hereinafter, description of a "generally matching" range will be made by way of example.

Figure 20A:
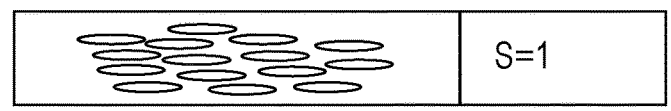
FIG. 20A is a diagram for describing a placement configuration of the light shielding layers.
Figure 20B:
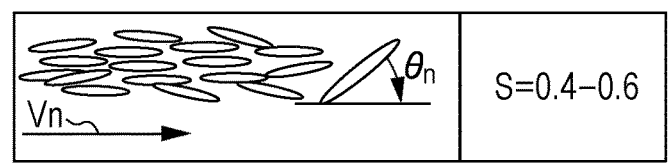
FIG. 20B is a diagram for describing a placement configuration of the light shielding layers.
Figure 20C:
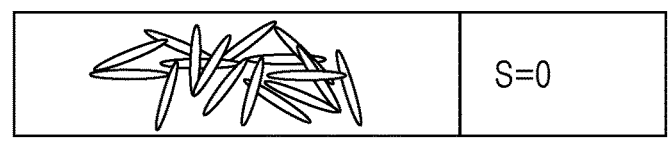
FIG. 20C is a diagram for describing a placement configuration of the light shielding layers.

FIG. 20A through FIG. 20C are diagrams for describing placement configurations of the light shielding layer. FIG. 20A illustrates a case where the major axes of each of the multiple light shielding layer are arrayed in completely the same direction. FIG. 20B illustrates a case where the major axes of the multiple light shielding layers are overall misaligned within a range of 30° to 40° in inclination angle θn as to an orientation vector Vn. FIG. 20C illustrates a case where the multiple light shielding layers are non-periodically arrayed. Note that "inclination angle θn" means an average value of angles of the major axes of each of the multiple light shielding layers as to the orientation vector Vn.

Figure 21:
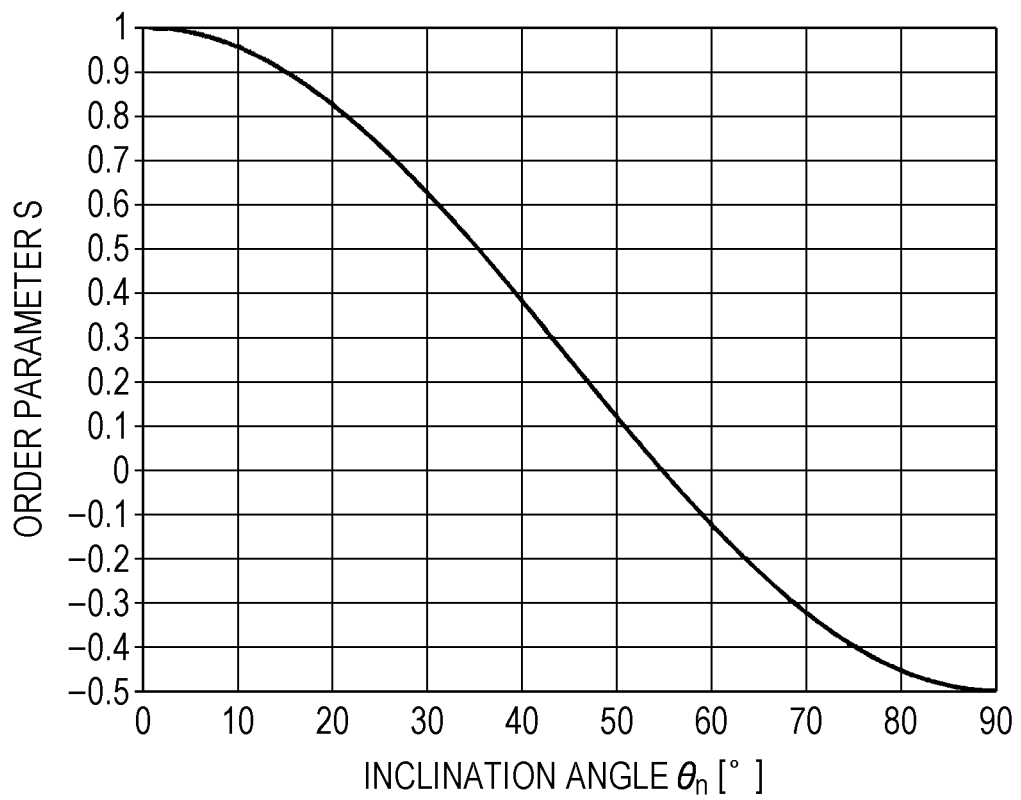
FIG. 21 is a diagram for describing the range of placement azimuths of the light shielding layers.

FIG. 21 is a diagram for describing the range of placement azimuths of the light shielding layers. In FIG. 21 the horizontal axis is inclination angle θn [°], and the vertical axis is an order parameter S.

The order parameter S is calculated by the following Expression (1).

[Math. 1]

$$S = \frac{1}{2} <3\cos^2\theta_n - 1> \qquad (1)$$

In a case where the major axes of the multiple light shielding layers each are aligned completely in one direction, the order parameter S is S=1, as illustrated in FIG. 20A and FIG. 21.

In a case where the major axes of the multiple light shielding layers are overall misaligned within a range of 30° to 40° in inclination angle θn as to an orientation vector Vn, the order parameter S is in a range of 0.4<S<0.6, as illustrated in FIG. 20B and FIG. 21.

In a case where the major axes of the multiple light shielding layers non-periodically disposed, the order parameter S is S=0, as illustrated in FIG. 20C and FIG. 21.

Thus, the range of placement orientation of the light shielding layers maybe a range where the order parameter S is S≥0.8. Accordingly, the major axes of each of the multiple light shielding layers may be misaligned as to the orientation vector Vn within a range where the inclination angle θn is θn≤20°.

Figure 22:
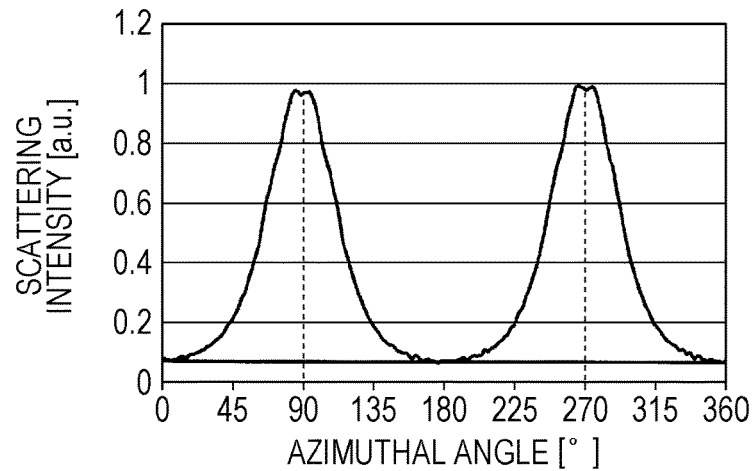
FIG. 22 is a diagram for describing azimuthal angle strong scattering properties of the light scattering member in the first embodiment.

FIG. 22 is a diagram for describing azimuthal angle strong scattering properties of the light scattering member 9 according to the present embodiment. FIG. 22 is the simulation results of having evaluated the strong scattering azimuth $\phi_0$ of the light diffusion member 9. The horizontal axis in FIG. 22 is the azimuthal angle θ[°], and the vertical axis is scattering intensity [a.u.].

It was confirmed that in the case of the light diffusion member 9 according to the present embodiment, the scattering intensity Iφ assumes the peak value at azimuthal angle $\phi=90°$, $270°$, and that the strong scattering azimuth $\phi_0$ was $\phi_0=90°$, $270°$, as illustrated in FIG. 22. The scattering intensity in the azimuth $\phi_0$ (90°, 270°)+$\Delta\phi$ and the scattering intensity in the azimuth $\phi_0$ (90°, 270°)−Δφ are generally the same across the strong scattering azimuth $\phi_0$ (90°, 270°) as the center axis.

Figure 23:
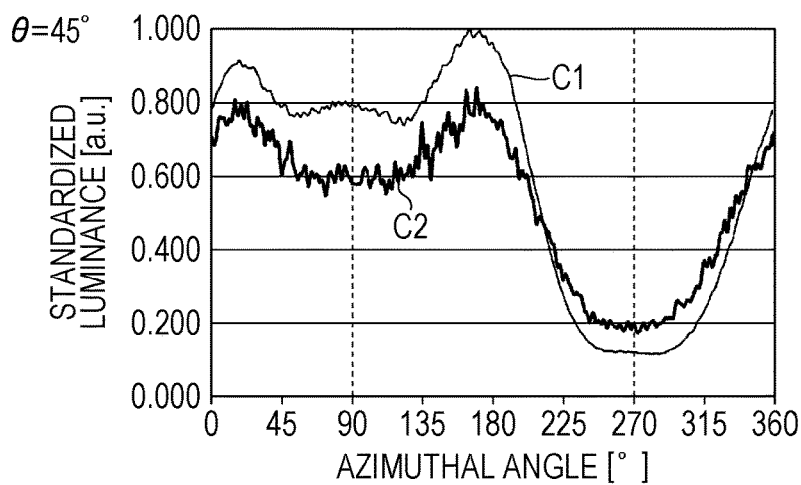
FIG. 23 is a diagram illustrating azimuthal angle luminance properties in polar angle θ: 45° direction, in the liquid crystal display device according to the first embodiment.
Figure 24:
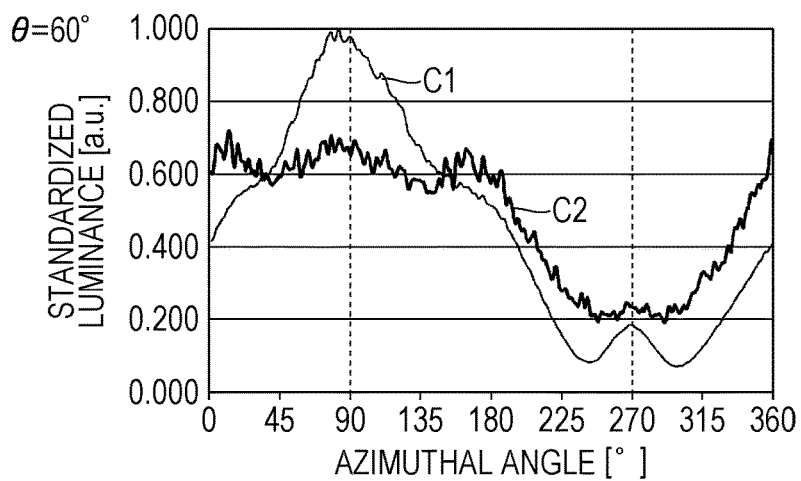
FIG. 24 is a diagram illustrating azimuthal angle luminance properties in polar angle θ: 60° direction, in the liquid crystal display device according to the first embodiment.

FIG. 23 and FIG. 24 are diagrams for describing azimuthal angle luminance properties of the liquid crystal display device 1 according to the present embodiment, showing the simulation results of having evaluated horizontal direction symmetry of the viewing angle of the liquid crystal display device 1.

FIG. 23 is a diagram illustrating azimuthal angle luminance properties in polar angle θ: 45° direction, in the liquid crystal display device 1 according to the first embodiment.

FIG. 24 is a diagram illustrating azimuthal angle luminance properties in polar angle θ: 60° direction, in the liquid crystal display device 1 according to the first embodiment.

In FIG. 23 and FIG. 24, the horizontal axis is the azimuthal angle θ[°], and the vertical axis is standardized [a.u.]. Symbol C1 is the liquid crystal display device according to the comparative example, and symbol C2 is the liquid crystal display device 1 according to the present embodiment. A commercially-available TN display (one without a light diffusion member) was used as the liquid crystal display device according to the comparative example. The light diffusion member was applied to the surface of the commercially-available TN display for the liquid crystal display device 1 according to the present embodiment.

It was confirmed that the luminance improved in the range of azimuthal angle φ=225° to 315° in the liquid crystal display device 1 according to the present embodiment, due to the scattering effect of the light diffusion member 9, as illustrated in FIG. 23 and FIG. 24. The luminance distribution was horizontally symmetrical centered on azimuthal angle φ=90°, 270° as well. Accordingly, it can be seen that horizontal symmetry of viewing angle has not been lost.

As described above, according to the present embodiment, the light diffusion member 9 in the present embodiment is disposed on the light-emitting side of the liquid crystal panel 2, so incident light to the light diffusion member 9 is emitted from the light diffusion member 9 in a state where the angular distribution is broader than before entering the light diffusion member 9. Accordingly, an observer can view a good display even if the line of view is tilted away from the frontal direction (normal direction) of the liquid crystal display device 1.

Further, according to the present embodiment the light shielding layers 40 have major axes orthogonal to the strong scattering azimuth $\phi_0$ (center axis) and the major axes of the multiple light shielding layers 40 are aligned in one direction. In this case, the scattering intensity in the azimuth $\phi_0$ (90°,270°)+Δφ and the scattering intensity in the azimuth $\phi_0$ (90°, 270°)−Δφ are generally the same across the strong scattering azimuth $\phi_0$ (90°,270°) as the center axis. Accordingly, the luminance distribution of the liquid crystal display device 1 is horizontally symmetrical across the strong scattering azimuth φ=90°, 270° as the center. Thus, the light diffusion member 9, which can maintain a horizontal symmetry of viewing angle while broadening the viewing angle, can be provided. Also, the liquid crystal display device 1 with excellent display quality can be provided.

Further, the low-directionality backlight is used in the present embodiment, as described earlier.

In this case, light which has spread to a certain extent enters the light diffusion member 9. Accordingly, light in a state of having a broader angular distribution is emitted from the light diffusion member 9, as compared to a case of using a backlight with high directionality. Thus, light emitted from portions difficult to see and light emitted from portions easy to see is mixed, so the degree of change in luminance can be averaged. Accordingly, an observer can view a good display even if the line of view is tilted away from the frontal direction (normal direction) of the liquid crystal display device 1.

Further, the azimuthal angle direction where the luminance change of the polar angel direction of the backlight 8 is the largest, and the azimuthal angle direction where the transmissivity change in polar angle of the light diffusion member 9 is largest in a case where a constant voltage is applied to the liquid crystal panel 2 (azimuthal angle φ: 90°-270° direction), are generally matched in the present embodiment. Accordingly, of the light emitted from the backlight 8, light with relatively high directionality can be strongly diffused. Consequently, the narrowness of viewing angle of luminance of the liquid crystal panel 2 in the azimuthal angle φ: 90°-270° direction is improved. Accordingly, the liquid crystal display device 1 with excellent properties of viewing angle of luminance can be provided.

Although description has been made regarding an example where the backlight 8 according to the present embodiment is a low-directionality backlight where the emission direction of light has been controlled to where the directionality is somewhat broadly set, but this is not restrictive. For example, the backlight may be a high-directionality backlight where the directionality has been set higher than the low-directionality backlight (see FIG. 12).

Also, description has been made by way of an example where the multiple light shielding layers 40 are configured using light shielding layers 40 that are elliptic in plan view, but this is not restrictive. For example, the multiple light shielding layers may include shapes where the planar shapes are circular, polygonal, half-circle, and so forth. Light shielding layers of such shapes may be included as long as the scattering intensity at azimuth $\phi_0$+Δφ and the scattering intensity at azimuth $\phi_0$−Δφ are generally equal across strong scattering azimuth $\phi_0$ as the center axis in the light diffusion member, so that the horizontal symmetry of viewing angle can be maintained. It is sufficient that the luminance distribution of the liquid crystal panel 2 being generally line-symmetrical at the liquid crystal display device.

Second Embodiment

A second embodiment of the present invention will be described with reference to FIG. 25 through FIG. 28.

Figure 25:
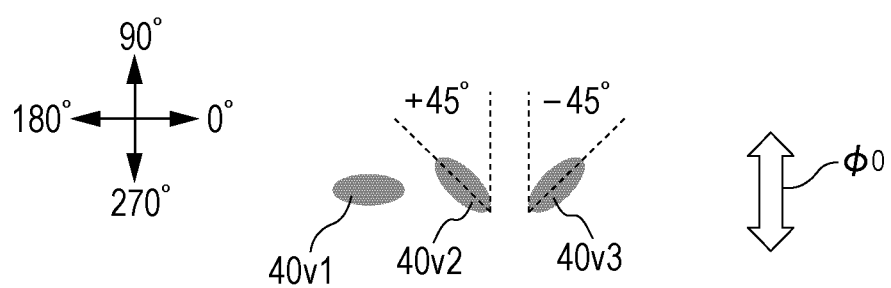
FIG. 25 is a diagram for describing a placement configuration of light shielding layers as to a strong scattering azimuth in a second embodiment.

FIG. 25 is a diagram for describing a placement configuration of light shielding layers as to a strong scattering azimuth $\phi_0$ in the second embodiment. Only part of the multiple light shielding layers are illustrated in FIG. 25, for the sake of convenience.

As illustrated in FIG. 25, the basic configuration of the liquid crystal display device according to the present embodiment is the same as that of the first embodiment, and differs from the first embodiment with regard to the point that it includes multiple first light shielding layers 40v1 having a major axis orthogonal to the strong scattering azimuth $\phi_0$ (center axis), second light shielding layers 40v2 having a major axis at +45° to the strong scattering azimuth $\phi_0$, and third light shielding layers 40v3 having a major axis at −45° to the strong scattering azimuth $\phi_0$, the shape and size of the second light shielding layers 40v2 and the shape and size of the third light shielding layers 40v2 being the same, and the number of the second light shielding layers 40v2 and the third light shielding layers 40v3 being the same.

Components in FIG. 25 through FIG. 28 which are the same as components in the drawings used in the first embodiment are denoted with the same reference numerals, and detailed description thereof will be omitted.

The presence ratio of the light shielding layers according to the present embodiment per unit area (hereinafter may be referred to simply as "presence ratio") is N1:N2:N3=2:1:1, where the number of first light shielding layers 40v1: number of second light shielding layers 40v2: number of third light shielding layers 40v3=N1:N2:N3.

Figure 26:
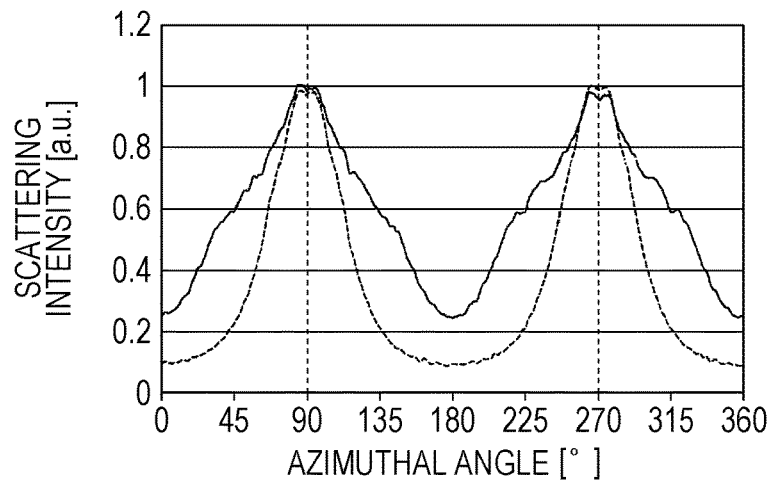
FIG. 26 is a diagram for describing azimuthal angle strong scattering properties of the light scattering member in the second embodiment.

FIG. 26 is a diagram for describing azimuthal angle strong scattering properties of the light scattering member according to the present embodiment along with azimuthal angle strong scattering properties of the light scattering member according to the first embodiment. FIG. 26 is the simulation results of having evaluated the strong scattering azimuth $\phi_0$ of the light diffusion member. The horizontal axis in FIG. 26 is the azimuthal angle $\theta[°]$, and the vertical axis is scattering intensity [a.u.]. The azimuthal angle strong scattering properties of the light scattering member according to the present embodiment are indicated by the solid line, and the azimuthal angle strong scattering properties of the light scattering member according to the first embodiment are indicated by the dotted line.

It was confirmed that in the case of the light diffusion member according to the present embodiment as well, the scattering intensity $I\phi$ assumes the peak value at azimuthal angle $\phi=90°, 270°$, and that the strong scattering azimuth $\phi_0$ was $\phi_0=90°, 270°$. The scattering intensity in the azimuth $\phi_0$ (90°, 270°)+$\Delta\phi$ and the scattering intensity in the azimuth $\phi_0$ (90°, 270°)-$\Delta\phi$ are generally the same across the strong scattering azimuth $\phi_0$ (90°,270°) as the center axis, as illustrated in FIG. 26. Further, the difference in scattering intensity among each azimuthal angle is reduced by the light diffusion member according to the present embodiment, in comparison with the light diffusion member 9 according to the first embodiment.

Figure 27:
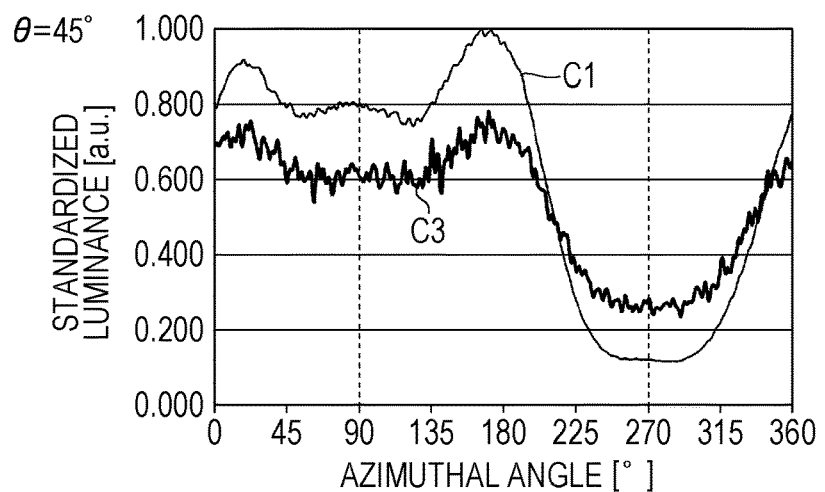
FIG. 27 is a diagram illustrating azimuthal angle luminance properties in polar angle θ: 45° direction, in the liquid crystal display device according to the second embodiment.
Figure 28:
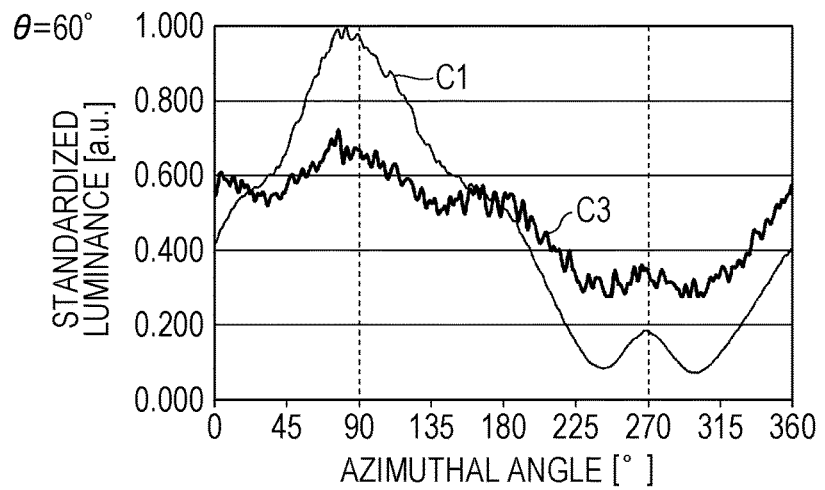
FIG. 28 is a diagram illustrating azimuthal angle luminance properties in polar angle θ: 60° direction, in the liquid crystal display device according to the second embodiment.

FIG. 27 and FIG. 28 are diagrams for describing azimuthal angle luminance properties of the liquid crystal display device according to the present embodiment, showing the simulation results of having evaluated horizontal direction symmetry of the viewing angle of the liquid crystal display device.

FIG. 27 is a diagram illustrating azimuthal angle luminance properties in polar angle $\theta$: 45° direction, in the liquid crystal display device according to the present embodiment.

FIG. 28 is a diagram illustrating azimuthal angle luminance properties in polar angle $\theta$: 60° direction, in the liquid crystal display device according to the present embodiment.

In FIG. 27 and FIG. 28, the horizontal axis is the azimuthal angle $\theta[°]$, and the vertical axis is standardized luminance [a.u.]. Symbol C1 is the liquid crystal display device according to the comparative example, and symbol C3 is the liquid crystal display device 1 according to the present embodiment. A commercially-available TN display (one without a light diffusion member) was used as the liquid crystal display device according to the comparative example. The light diffusion member was applied to the surface of the commercially-available TN display for the liquid crystal display device according to the present embodiment.

It was confirmed that the luminance improved in the range of azimuthal angle $\phi=225°$ to 315° in the liquid crystal display device 1 according to the present embodiment, due to the scattering effect of the light diffusion member, as illustrated in FIG. 27 and FIG. 28. The luminance distribution was horizontally symmetrical centered on azimuthal angle $\phi=90°, 270°$ as well. Accordingly, it can be seen that horizontal symmetry of viewing angle has not been lost. Further, the difference in luminance difference among each azimuthal angle is reduced in the liquid crystal display device according to the present embodiment, in comparison with the liquid crystal display device 1 according to the first embodiment.

A light diffusion member which can maintain a horizontal symmetry of viewing angle while broadening the viewing angle can be provided by the present embodiment as well. Also, the same advantage as the first embodiment, which is that a liquid crystal display device with excellent display quality can be provided, is realized.

Further, the present embodiment has light shielding layers which have angles of opposite signs with regard to the angle of the major axes of the light shielding layers as to the strong scattering azimuth $\phi_0$. Accordingly, the difference in scattering intensity among each azimuthal angle is reduced in the light diffusion member according to the present embodiment, in comparison with the light diffusion member 9 according to the first embodiment.

Accordingly, the difference in luminance difference among each azimuthal angle is reduced in the liquid crystal display device according to the present embodiment, in comparison with the liquid crystal display device 1 according to the first embodiment. Thus, the degree of change in luminance in the azimuthal angle direction can be reduced, and visual recognition can be improved.

While description of the present embodiment has been made by way of multiple second light shielding layers 40v2 having a major axis at +45° to the strong scattering azimuth $\phi_0$, and multiple third light shielding layers 40v3 having a major axis at -45° to the strong scattering azimuth $\phi_0$, this is not restrictive. The angles of the major axes of the second light shielding layers and the third light shielding layers as to the strong scattering azimuth $\phi_0$ may be different from these angles. For example, multiple second light shielding layers having a major axis at +30° to the strong scattering azimuth $\phi_0$ and multiple third light shielding layers having a major axis at -30° to the strong scattering azimuth $\phi_0$ may be employed. That is to say, it is sufficient to include multiple first light shielding layers having a major axis orthogonal to the strong scattering azimuth $\phi_0$, multiple second light shielding layers having a major axis at an angle of +$\alpha$ to the strong scattering azimuth $\phi_0$, and multiple third light shielding layers having a major axis at an angle of -$\alpha$ to the strong scattering azimuth $\phi_0$.

While description of the present embodiment has been made by way of an example where the shape and size of the second light shielding layers 40v2 and the shape and size of the multiple third light shielding layers 40v3 are the same, this is not restrictive. The shape and size of the second light shielding layers and the shape and size of the third light shielding layers may each be slightly different. Also, the presence ratio of the light shielding layers is not restricted to 2:1:1. For example, the presence ratio of the light shielding layers may be 1:2:2, or 3:1:1. It is sufficient for the shape and size of the second light shielding layers and the shape and size of the third light shielding layers to be generally the same, and the number of the second light shielding layers and the number of the third light shielding layers generally the same, so that horizontal direction symmetry of the viewing angle can be maintained even with such differences.

Third Embodiment

A third embodiment of the present invention will be described with reference to FIG. 29.

Figure 29:
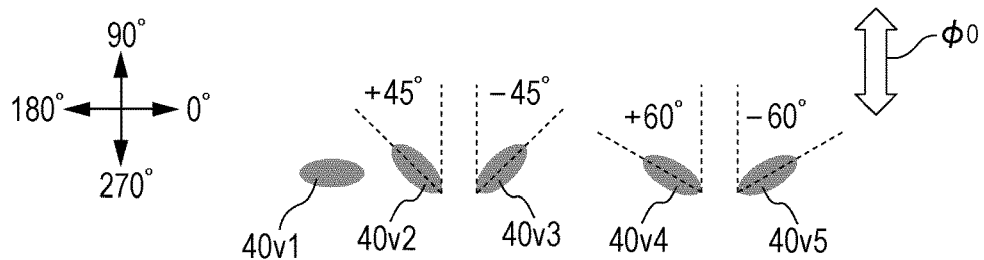
FIG. 29 is a diagram for describing a placement configuration of light shielding layers as to a strong scattering azimuth in a third embodiment.

FIG. 29 is a diagram for describing a placement configuration of light shielding layers as to a strong scattering azimuth $\phi_0$ in the third embodiment. Only part of the multiple light shielding layers are illustrated in FIG. 29, for the sake of convenience.

As illustrated in FIG. 29, the basic configuration of the liquid crystal display device according to the present embodiment is the same as that of the first embodiment, and differs from the first embodiment with regard to the point that it includes multiple first light shielding layers 40v1 having a major axis orthogonal to the strong scattering azimuth $\phi_0$ (center axis), second light shielding layers 40v2 having a major axis at +45° to the strong scattering azimuth $\phi_0$, third light shielding layers 40v3 having a major axis at −45° to the strong scattering azimuth $\phi_0$, fourth light shielding layers 40v4 having a major axis at +60° to the strong scattering azimuth $\phi_0$, and fifth light shielding layers 40v5 having a major axis at −60° to the strong scattering azimuth $\phi_0$. The shape and size of the second light shielding layers 40v2 and the shape and size of the third light shielding layers 40v3 are the same, and shape and size of the fourth light shielding layers 40v4 and the shape and size of the fifth light shielding layers 40v5 are the same. The number of the second light shielding layers 40v2 and the third light shielding layers 40v3 are the same, and the number of the fourth light shielding layers 40v4 and the fifth light shielding layers 40v5 are the same.

Components in FIG. 29 which are the same as components in the drawings used in the first embodiment are denoted with the same reference numerals, and detailed description thereof will be omitted.

The presence ratio of the light shielding layers according to the present embodiment is N1:N2:N3:N4:N5=5:2:2:1:1, where the number of first light shielding layers 40v1: number of second light shielding layers 40v2: number of third light shielding layers 40v3: number of fourth light shielding layers 40v4: number of fifth light shielding layers 40v5=N1:N2:N3:N4:N5.

A light diffusion member which can maintain a horizontal symmetry of viewing angle while broadening the viewing angle can be provided by the present embodiment as well. Also, the same advantage as the first embodiment, which is that a liquid crystal display device with excellent display quality can be provided, is realized.

Further, in comparison with the second embodiment, the present embodiment has a greater number of types of light shielding layers which have angles of opposite signs with regard to the angle of the major axes of the light shielding layers as to the strong scattering azimuth $\phi_0$. Accordingly, the difference in scattering intensity among each azimuthal angle is reduced in the light diffusion member according to the present embodiment, in comparison with the light diffusion member according to the second embodiment. Accordingly, the difference in luminance among each azimuthal angle is reduced in the liquid crystal display device according to the present embodiment, in comparison with the liquid crystal display device according to the second embodiment. Thus, the degree of change in luminance in the azimuthal angle direction can be reduced, and visual recognition can be improved.

While description of the present embodiment has been made by way of multiple second light shielding layers 40v2 having a major axis at +45° to the strong scattering azimuth $\phi_0$, multiple third light shielding layers 40v3 having a major axis at −45° to the strong scattering azimuth $\phi_0$, multiple fourth light shielding layers 40v4 having a major axis at +60° to the strong scattering azimuth $\phi_0$, and multiple fifth light shielding layers 40v5 having a major axis at −60° to the strong scattering azimuth $\phi_0$, this is not restrictive. The angles of the major axes of the second light shielding through fifth light shielding layers as to the strong scattering azimuth $\phi_0$ may be different from these angles. For example, multiple second light shielding layers having a major axis at +30° to the strong scattering azimuth $\phi_0$, multiple third light shielding layers having a major axis at −30° to the strong scattering azimuth $\phi_0$, multiple fourth light shielding layers having a major axis at +75° to the strong scattering azimuth $\phi_0$, and multiple fifth light shielding layers having a major axis at −75° to the strong scattering azimuth $\phi_0$, may be employed. That is to say, it is sufficient to include multiple first light shielding layers having a major axis orthogonal to the strong scattering azimuth $\phi_0$, multiple second light shielding layers having a major axis at an angle of +α to the strong scattering azimuth $\phi_0$, multiple third light shielding layers having a major axis at an angle of −α to the strong scattering azimuth $\phi_0$, multiple fourth light shielding layers having a major axis at an angle of +β to the strong scattering azimuth $\phi_0$, multiple fifth light shielding layers having a major axis at an angle of −β to the strong scattering azimuth $\phi_0$.

While description of the present embodiment has been made by way of four types of light shielding layers (second light shielding layer through fifth light shielding layer) which have angles of opposite signs with regard to the angle of the major axes of the light shielding layers as to the strong scattering azimuth $\phi_0$, this is not restrictive. For example, five or more types of multiple types of light shielding layers may be used which have angles of opposite signs with regard to the angle of the major axes of the light shielding layers as to the strong scattering azimuth $\phi_0$.

While description of the present embodiment has been made by way of an example where the shape and size of the second light shielding layers 40v2 and the shape and size of the multiple third light shielding layers 40v3 are the same, and the shape and size of the fourth light shielding layers 40v4 and the shape and size of the multiple fifth light shielding layers 40v5 are the same, this is not restrictive. The shape and size of the second light shielding layers and the shape and size of the third light shielding layers may each be slightly different, and the shape and size of the fourth light shielding layers and the shape and size of the fifth light shielding layers may each be slightly different. Also, the presence ratio of the light shielding layers is not restricted to 5:2:2:1:1. For example, the presence ratio of the light shielding layers may be 4:3:3:1:1, or 3:1:1:2:2. It is sufficient for the shape and size of the second light shielding layers and the shape and size of the third light shielding layers to be generally the same and the shape and size of the fourth light shielding layers and the shape and size of the fifth light shielding layers to be generally the same, and the number of the second light shielding layers and the number of the third light shielding layers generally the same and the number of the fourth light shielding layers and the number of the fifth light shielding layers generally the same, so that horizontal direction symmetry of the viewing angle can be maintained even with such differences.

Fourth Embodiment

A fourth embodiment of the present invention will be described with reference to FIG. 30.

Figure 30:
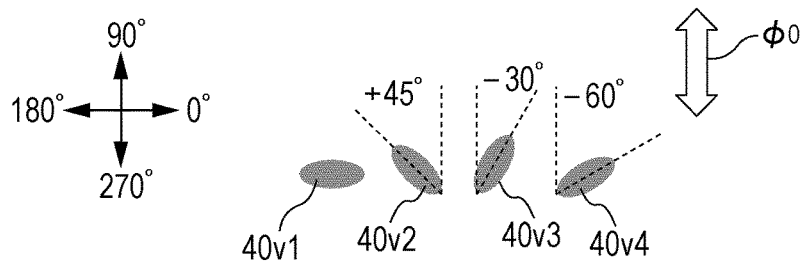
FIG. 30 is a diagram for describing a placement configuration of light shielding layers as to a strong scattering azimuth in a fourth embodiment.

FIG. 30 is a diagram for describing a placement configuration of light shielding layers as to a strong scattering azimuth $\phi_0$ in the fourth embodiment. Only part of the multiple light shielding layers are illustrated in FIG. 30, for the sake of convenience.

As illustrated in FIG. 30, the basic configuration of the liquid crystal display device according to the present embodiment is the same as that of the first embodiment, and differs from the first embodiment with regard to the point that it includes multiple first light shielding layers 40v1 having a major axis orthogonal to the strong scattering azimuth $\phi_0$ (center axis), second light shielding layers 40v2 having a major axis at +45° to the strong scattering azimuth $\phi_0$, third light shielding layers 40v3 having a major axis at −30° to the strong scattering azimuth $\phi_0$, and fourth light shielding layers 40v4 having a major axis at −60° to the strong scattering azimuth $\phi_0$. The shape and size of the second light shielding layers 40v2, the shape and size of the third light shielding layers 40v3, and the shape and size of the fourth light shielding layers 40v4, are the same. The number of the second light shielding layers 40v2, and the total of the number of the third light shielding layers 40v3 and the number of the fourth light shielding layers 40v4 are the same.

Components in FIG. 30 which are the same as components in the drawings used in the first embodiment are denoted with the same reference numerals, and detailed description thereof will be omitted.

The presence ratio of the light shielding layers according to the present embodiment is N1:N2:N3:N4=4:2:1:1, where the number of first light shielding layers 40v1: number of second light shielding layers 40v2: number of third light shielding layers 40v3: number of fourth light shielding layers 40v4=N1:N2:N3:N4.

A light diffusion member which can maintain a horizontal symmetry of viewing angle while broadening the viewing angle can be provided by the present embodiment as well. Also, the same advantage as the first embodiment, which is that a liquid crystal display device with excellent display quality can be provided, is realized.

Further, light shielding layers which have different angles of opposite signs with regard to the angle of the major axes of the light shielding layers as to the strong scattering azimuth $\phi_0$. Although the placement patterns of the light shielding layers are different at the right and the left, half each of the third light shielding layers 40v3 having a major axis at −30° to the strong scattering azimuth $\phi_0$, and fourth light shielding layers 40v4 having a major axis at −60° to the strong scattering azimuth $\phi_0$ exist as to the number of the second light shielding layers 40v2 having a major axis at +45° to the strong scattering azimuth $\phi_0$, which can be conceived as being equivalent to the number of light shielding layers having a major axis at +45° and the number of light shielding layers having a major axis at −45° being the same, so the horizontal balance is generally maintained. Accordingly, the difference in scattering intensity among each azimuthal angle can be reduced in the light diffusion member according to the present embodiment, in comparison with the light diffusion member 9 according to the first embodiment. Accordingly, the difference in luminance among each azimuthal angle can be reduced in the liquid crystal display device according to the present embodiment, in comparison with the liquid crystal display device 1 according to the first embodiment. Thus, the degree of change in luminance in the azimuthal angle direction can be reduced, and visual recognition can be improved.

While description of the present embodiment has been made by way of multiple second light shielding layers 40v2 having a major axis at +45° to the strong scattering azimuth $\phi_0$, multiple third light shielding layers 40v3 having a major axis at −30° to the strong scattering azimuth $\phi_0$, and multiple fourth light shielding layers 40v4 having a major axis at −60° to the strong scattering azimuth $\phi_0$, this is not restrictive. The angles of the major axes of the second light shielding through fourth light shielding layers as to the strong scattering azimuth $\phi_0$ may be different from these angles. For example, multiple second light shielding layers having a major axis at +30° to the strong scattering azimuth $\phi_0$, multiple third light shielding layers having a major axis at −15° to the strong scattering azimuth $\phi_0$, and multiple fourth light shielding layers having a major axis at −45° to the strong scattering azimuth $\phi_0$, may be employed. That is to say, it is sufficient to include multiple first light shielding layers having a major axis orthogonal to the strong scattering azimuth $\phi_0$, multiple second light shielding layers having a major axis at an angle of +α to the strong scattering azimuth $\phi_0$, multiple third light shielding layers having a major axis at an angle of −β to the strong scattering azimuth $\phi_0$, and multiple fourth light shielding layers having a major axis at an angle of −γ to the strong scattering azimuth $\phi_0$, with a satisfying the relationship of α=(β+γ)/2.

While description of the present embodiment has been made by way of an example where the shape and size of the second light shielding layers 40v2, the shape and size of the third light shielding layers 40v3 are the same, and the shape and size of the fourth light shielding layers 40v4 are the same, this is not restrictive. The shape and size of the second light shielding layers, the shape and size of the third light shielding layers, and the shape and size of the fourth light shielding layers, may each be slightly different. Also, the presence ratio of the light shielding layers is not restricted to 4:2:1:1. For example, the presence ratio of the light shielding layers may be 4:3:1:1, or 3:1:2:2. It is sufficient for the shape and size of the second light shielding layers, the shape and size of the third light shielding layers, and the shape and size of the fourth light shielding layers, to be generally the same, and the number of the second light shielding layers, and the total of the number of the third light shielding layers and the number of the fourth light shielding layers generally the same, so that horizontal direction symmetry of the viewing angle can be maintained even with such differences.

Fifth Embodiment

A fifth embodiment of the present invention will be described with reference to FIG. 31.

Figure 31:
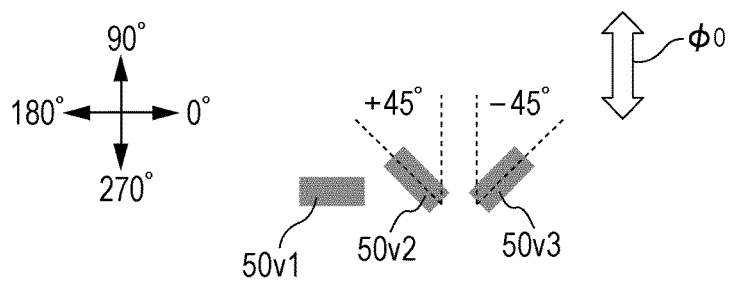
FIG. 31 is a diagram for describing a placement configuration of light shielding layers as to a strong scattering azimuth in a fifth embodiment.

FIG. 31 is a diagram for describing a placement configuration of light shielding layers as to a strong scattering azimuth $\phi_0$ in the fifth embodiment. Only part of the multiple light shielding layers are illustrated in FIG. 31, for the sake of convenience.

As illustrated in FIG. 31, the basic configuration of the present embodiment is the same as that of the second embodiment, and differs from the second embodiment with regard to the point that the planar shape of the light shielding layers (first light shielding layer 50v1, second light shielding layer 50v2, and third light shielding layer 50v3) is rectangular.

Components in FIG. 31 which are the same as components in the drawings used in the second embodiment are denoted with the same reference numerals, and detailed description thereof will be omitted.

The presence ratio of the light shielding layers according to the present embodiment is N1:N2:N3=5:2:2, where the number of first light shielding layers 50v1: number of second light shielding layers 50v2: number of third light shielding layers 50v3=N1:N2:N3.

A light diffusion member which can maintain a horizontal symmetry of viewing angle while broadening the viewing angle can be provided by the present embodiment as well. Also, a liquid crystal display device with excellent display quality can be provided. Further, advantages the same as those of the second embodiment, that the degree of change in luminance in the azimuthal angle direction can be reduced and visual recognition can be improved, can be realized.

The presence ratio of the light shielding layers is not restricted to 2:1:1 in the present embodiment. For example, the presence ratio of the light shielding layers may be 1:2:2, or 3:1:1. It is sufficient for the number of the second light shielding layers and the number of the third light shielding layers to be generally the same, so that horizontal direction symmetry of the viewing angle can be maintained even with such differences.

Sixth Embodiment

A sixth embodiment of the present invention will be described with reference to FIG. 32.

Figure 32:
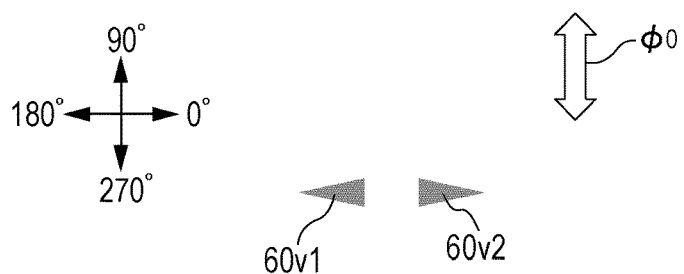
FIG. 32 is a diagram for describing a placement configuration of light shielding layers as to a strong scattering azimuth in a sixth embodiment.

FIG. 32 is a diagram for describing a placement configuration of light shielding layers as to a strong scattering azimuth $\phi_0$ in the sixth embodiment. Only part of the multiple light shielding layers are illustrated in FIG. 32, for the sake of convenience.

As illustrated in FIG. 32, the basic configuration of the present embodiment is the same as that of the first embodiment, and differs from the first embodiment with regard to the point that it includes multiple first light shielding layers 60v1 which are light shielding layer that have a shape in planar view of isosceles triangles having a major axis orthogonal to the strong scattering azimuth 4o (center axis) and multiple second light shielding layers 60v2 which are light shielding layer that have a shape in planar view of isosceles triangles having a major axis orthogonal to the strong scattering azimuth $\phi_0$, and the planar shapes of the light shielding layers face opposite to the first light shielding layers 60v1, the number of the first light shielding layers 60v1 and the number of the second light shielding layers 60v2 being the same.

Components in FIG. 32 which are the same as components in the drawings used in the first embodiment are denoted with the same reference numerals, and detailed description thereof will be omitted.

The presence ratio of the light shielding layers according to the present embodiment is N1:N2=1:1, where the number of first light shielding layers 60v1: number of second light shielding layers 60v2=N1:N2.

The planar shapes of the light shielding layer are only uniaxially symmetrical in the present embodiment, but the same numbers facing in opposite directions are laid out, so the horizontal balance is generally maintained.

Accordingly, a light diffusion member which can maintain a horizontal symmetry of viewing angle while broadening the viewing angle can be provided by the present embodiment as well. Also, the same advantage as the first embodiment, which is that a liquid crystal display device with excellent display quality can be provided, is realized.

Note that the presence ratio of the light shielding layers is not restricted to 1:1 in the present embodiment. For example, the presence ratio of the light shielding layers may be 100:99, or 99:100. It is sufficient for the number of the first light shielding layers and the number of the second light shielding layers to be generally the same, so that horizontal direction symmetry of the viewing angle can be maintained even with such differences.

Seventh Embodiment

A seventh embodiment of the present invention will be described with reference to FIG. 33 through FIG. 37.

Figure 33:
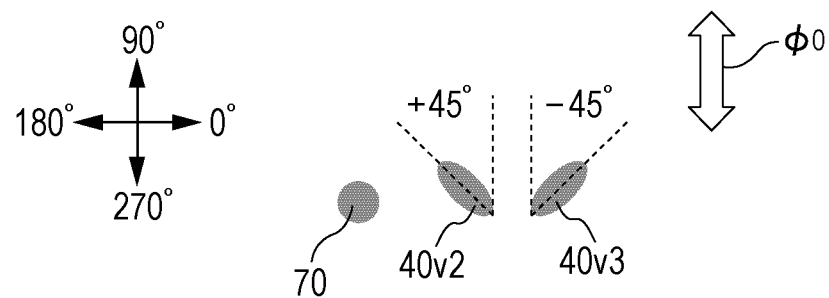
FIG. 33 is a diagram for describing a placement configuration of light shielding layers as to a strong scattering azimuth in a seventh embodiment.

FIG. 33 is a diagram for describing a placement configuration of light shielding layers as to a strong scattering azimuth $\phi_0$ in the seventh embodiment. Only part of the multiple light shielding layers are illustrated in FIG. 33, for the sake of convenience.

As illustrated in FIG. 33, the basic configuration of the present embodiment is the same as that of the first embodiment, and differs from the first embodiment with regard to the point that it includes multiple first light shielding layers 70 where the shapes of the light shielding layers in planar view are circular, second light shielding layers 40v2 having a major axis at +45° to the strong scattering azimuth $\phi_0$ (center axis), and third light shielding layers 40v3 having a major axis at −45° to the strong scattering azimuth $\phi_0$, the shape and size of the second light shielding layers 40v2 and the shape and size of the third light shielding layers 40v2 being the same, and the number of the second light shielding layers 40v2 and the third light shielding layers 40v3 being the same.

Components in FIG. 33 through FIG. 37 which are the same as components in the drawings used in the first embodiment are denoted with the same reference numerals, and detailed description thereof will be omitted.

The presence ratio of the light shielding layers according to the present embodiment is N1:N2:N3=2:1:1, where the number of first light shielding layers 70v1: number of second light shielding layers 40v2: number of third light shielding layers 40v3=N1:N2:N3.

Figure 34:
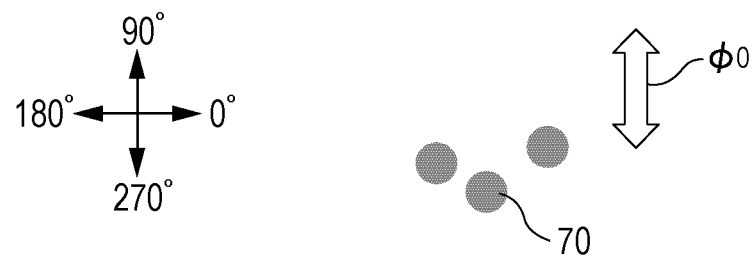
FIG. 34 is a diagram for describing a placement configuration of light shielding layers that are round in plan view, as to a strong scattering azimuth.

FIG. 34 is a diagram for describing a placement configuration of light shielding layers 70 as to a strong scattering azimuth $\phi_0$. Only part of the multiple light shielding layers are illustrated in FIG. 34, for the sake of convenience.

As illustrated in FIG. 34, the light diffusion member according to the present embodiment includes multiple first light shielding layers 70 circular in planar view, except for the second light shielding layers 40v2 and third light shielding layers 40v3 (omitted from illustration).

Figure 35:
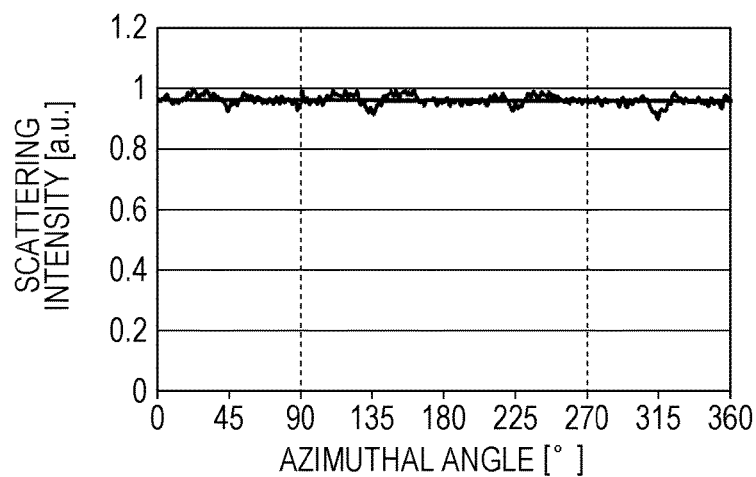
FIG. 35 is a diagram for describing azimuthal angle strong scattering properties of a light scattering member having only light shielding layers that are round in plan view.

FIG. 35 is a diagram for describing azimuthal angle strong scattering properties of a light scattering member having only the first light shielding layers 70 circular in planar view. FIG. 35 is the simulation results of having evaluated the strong scattering azimuth $\phi_0$ of the light diffusion member. The horizontal axis in FIG. 35 is the azimuthal angle θ[°], and the vertical axis is scattering intensity [a.u.].

It was confirmed that in the case of the light scattering member having only the first light shielding layers 70 circular in planar view, the scattering intensity Iϕ does not assume a peak value at a particular azimuthal angle ϕ, and symmetry of scattering intensity was maintained at any azimuthal angle ϕ for the strong scattering azimuth $\phi_0$, as illustrated in FIG. 35.

Figure 36:
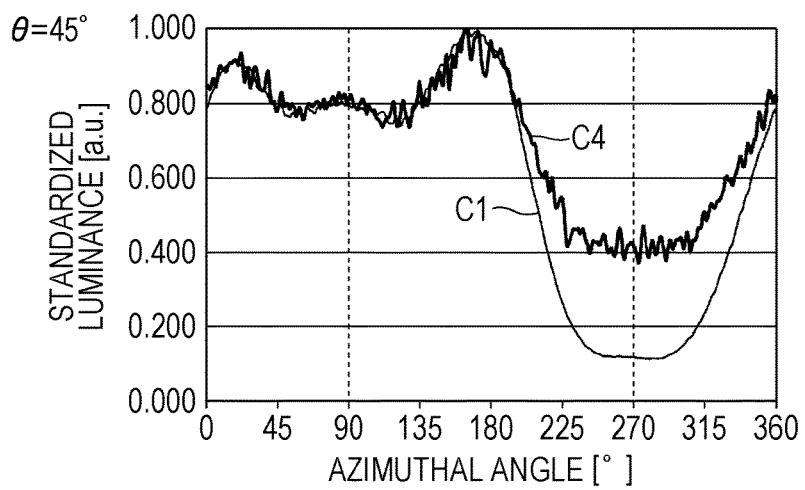
FIG. 36 is a diagram illustrating azimuthal angle luminance properties in polar angle θ: 45° direction, in the liquid crystal display device having only light shielding layers that are round in plan view.
Figure 37:
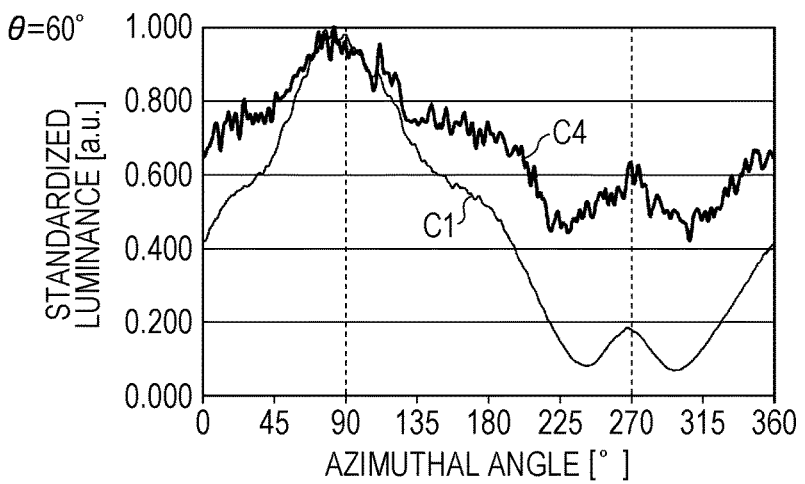
FIG. 37 is a diagram illustrating azimuthal angle luminance properties in polar angle θ: 60° direction, in the liquid crystal display device having only light shielding layers that are round in plan view.

FIG. 36 and FIG. 37 are diagrams for describing azimuthal angle luminance properties of the liquid crystal display device having only the first light shielding layers 70 circular in planar view, showing the simulation results of having evaluated horizontal direction symmetry of the viewing angle of the liquid crystal display device.

FIG. 36 is a diagram illustrating azimuthal angle luminance properties in polar angle θ: 45° direction, in the liquid crystal display device having only the first light shielding layers 70 circular in planar view.

FIG. 37 is a diagram illustrating azimuthal angle luminance properties in polar angle θ: 60° direction, in the liquid crystal display device having only the first light shielding layers 70 circular in planar view.

In FIG. 36 and FIG. 37, the horizontal axis is the azimuthal angle θ[°], and the vertical axis is standardized luminance [a.u.]. Symbol C1 is the liquid crystal display device according to the comparative example, and symbol C4 is the liquid crystal display device having only the first light shielding layers 70 circular in planar view. A commercially-available TN display (one without a light diffusion member) was used as the liquid crystal display device according to the comparative example. The light scattering member having only the first light shielding layers 70 circular in planar view was applied to the surface of the commercially-available TN display, for the liquid crystal display device having only the first light shielding layers 70 circular in planar view.

It was confirmed that the luminance improved in the range of azimuthal angle φ of 225° to 315° in the liquid crystal display device having only the first light shielding layers 70 circular in planar view, due to the scattering effect of the light diffusion member, as illustrated in FIG. 36 and FIG. 37. The luminance distribution was horizontally symmetrical centered on azimuthal angle φ=90°, 270° as well. Accordingly, it can be seen that horizontal symmetry of viewing angle has not been lost.

It is estimated from the results of FIG. 35 through FIG. 37 and the results of FIG. 26 through FIG. 28 described above, that difference in scattering intensity among each azimuthal angle is reduced in the liquid crystal display device according to the present embodiment in comparison with the liquid crystal display device 1 according to the first embodiment, in the same way as with the liquid crystal display device according to the second embodiment.

A light diffusion member which can maintain a horizontal symmetry of viewing angle while broadening the viewing angle can be provided by the present embodiment as well. Also, a liquid crystal display device with excellent display quality can be provided. Further, an advantage the same as that of the second embodiment, that the degree of change in luminance in the azimuthal angle direction can be reduced, and visual recognition can be improved, is realized.

While description of the present embodiment has been made by way of multiple second light shielding layers 40v2 having a major axis at +45° to the strong scattering azimuth φ$_0$, and multiple third light shielding layers 40v3 having a major axis at −45° to the strong scattering azimuth φ$_0$, this is not restrictive. The angles of the major axes of the second light shielding layers and the third light shielding layers as to the strong scattering azimuth φ$_0$ may be different from these angles. For example, multiple second light shielding layers having a major axis at +30° to the strong scattering azimuth φ$_0$ and multiple third light shielding layers having a major axis at −30° to the strong scattering azimuth φ$_0$ may be employed. That is to say, it is sufficient for the multiple light shielding layers to include multiple first light shielding layers circular in planar view, multiple second light shielding layers having a major axis at an angle of +α to the strong scattering azimuth φ$_0$, and multiple third light shielding layers having a major axis at an angle of −α to the strong scattering azimuth φ$_0$.

While description of the present embodiment has been made by way of an example where the shape and size of the second light shielding layers 40v2 and the shape and size of the multiple third light shielding layers 40v3 are the same, this is not restrictive. The shape and size of the second light shielding layers and the shape and size of the third light shielding layers may each be slightly different. Also, the presence ratio of the light shielding layers is not restricted to 2:1:1. For example, the presence ratio of the light shielding layers may be 1:2:2, or 3:1:1. It is sufficient for the shape and size of the second light shielding layers and the shape and size of the third light shielding layers to be generally the same, and the number of the second light shielding layers and the number of the third light shielding layers generally the same, so that horizontal direction symmetry of the viewing angle can be maintained even with such differences.

Also, while the above embodiment has been described by way of an example where the display mode of the liquid crystal panel 2 is the TN mode, but this is not restrictive. For example, the display mode of the liquid crystal panel may be VA mode.

Figure 38:
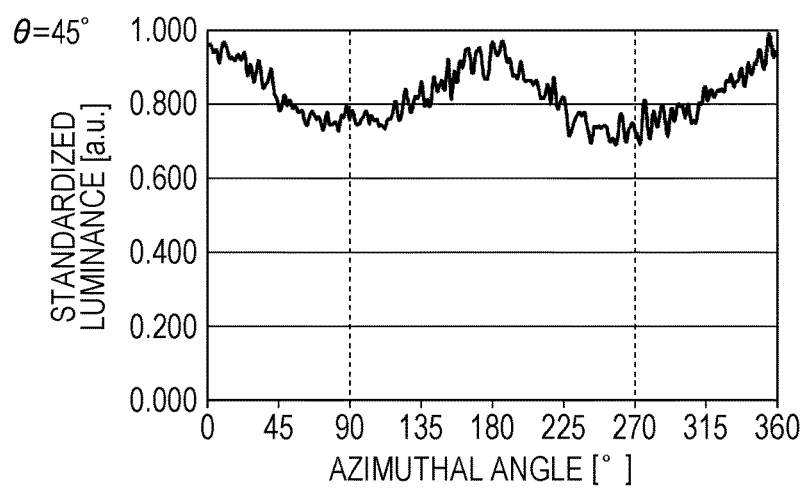
FIG. 38 is a diagram illustrating azimuthal angle luminance properties in polar angle θ: 45° direction, in a VA mode liquid crystal display device having only light shielding layers that are round in plan view.
Figure 39:
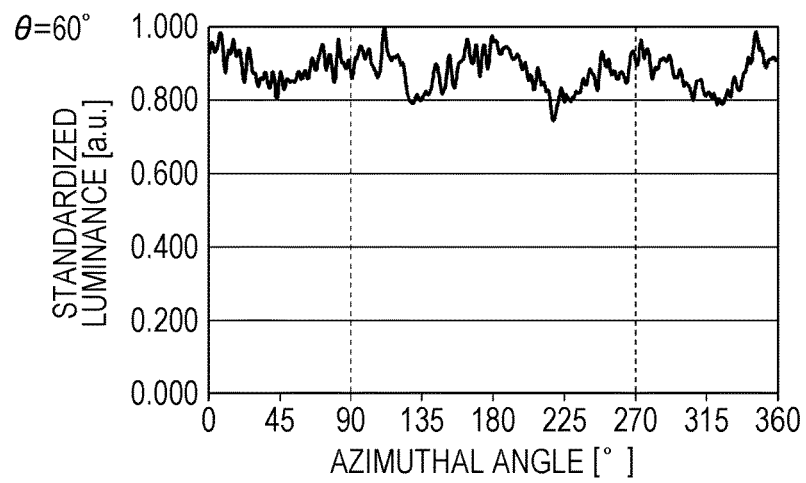
FIG. 39 is a diagram illustrating azimuthal angle luminance properties in polar angle θ: 60° direction, in a VA mode liquid crystal display device having only light shielding layers that are round in plan view.

FIG. 38 and FIG. 39 are diagrams illustrating azimuthal angle luminance properties in a VA mode liquid crystal display device having only light shielding layers that are round in plan view, illustrating simulation results of having evaluating horizontal direction symmetry of the viewing angle of the liquid crystal display device.

FIG. 38 is a diagram illustrating azimuthal angle luminance properties in polar angle θ: 45° direction, in the liquid crystal display device having only light shielding layers that are round in plan view.

FIG. 39 is a diagram illustrating azimuthal angle luminance properties in polar angle θ: 60° direction, in the liquid crystal display device having only first light shielding layers 70 that are round in plan view.

In FIG. 38 and FIG. 39, the horizontal axis is the azimuthal angle θ[°], and the vertical axis is standardized luminance [a.u.]. The light scattering member having only the first light shielding layers circular in planar view was applied to the surface of a commercially-available VA display, for the liquid crystal display device having only the light shielding layers circular in planar view.

It was confirmed that the luminance distribution was horizontally symmetrical centered on azimuthal angle φ=90°, 270° in the VA mode liquid crystal display device having only the light shielding layers circular in planar view, as well. Accordingly, it can be seen that horizontal symmetry of viewing angle has not been lost. Thus, horizontal direction symmetry of the viewing angle can be maintained with a VA mode liquid crystal display device, in the same way as a TN mode liquid crystal display device.

Eighth Embodiment

An eighth embodiment of the present invention will be described with reference to FIG. 40A through FIG. 40D.

The basic configuration of the present embodiment is the same as that of the first embodiment, and differs from the first embodiment with regard to the shape of the light shielding layer of the light diffusion member.

Accordingly, description of components the same as those in the drawings reference in the first embodiment will be omitted, and the light shielding layers will be described.

FIG. 40A through FIG. 40D are plan views of light shielding layers according to the present embodiment.

The shapes of the light shielding layers according to the present embodiment are anisotropic shapes having a major axis and minor axis, and having biaxial symmetry, as illustrated in FIG. 40A through FIG. 40D.

Figure 40A:
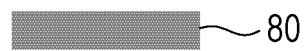
FIG. 40A is a plan view of a light shielding layer according to an eighth embodiment.
Figure 40B:
FIG. 40B is a plan view of a light shielding layer according to the eighth embodiment.
Figure 40C:
FIG. 40C is a plan view of a light shielding layer according to the eighth embodiment.
Figure 40D:
FIG. 40D is a plan view of a light shielding layer according to the eighth embodiment.

Specifically, the shape of a light shielding layer 80 illustrated in FIG. 40A is a rectangle. The shape of a light shielding layer 81 illustrated in FIG. 40B is a shape where the corners of a rectangle have been rounded. The shape of a light shielding layer 82 illustrated in FIG. 40C is a shape where the corners of a rectangle have been rounded further (slot shaped). The shape of a light shielding layer 83 illustrated in FIG. 40D is a rhombus.

The major axes of the light shielding layers 80 through 83 are orthogonal to the strong scattering azimuth $\phi_0$ (center axis) in the present embodiment.

Accordingly, a light diffusion member which can maintain a horizontal symmetry of viewing angle while broadening the viewing angle can be provided by the present embodiment as well. Also, the same advantage as the first embodiment, which is that a liquid crystal display device with excellent display quality can be provided, is realized.

Ninth Embodiment

A ninth embodiment of the present invention will be described with reference to FIG. 41 and FIG. 42.

The basic configuration of the liquid crystal display device according to the present embodiment is the same as that of the first embodiment, and differs from the first embodiment with regard to the point that multiple light diffusion portions 141 are disposed in a light diffusion member 109, i.e., that the light diffusion portions and the light shielding layers are inverted. Accordingly, the light diffusion member 109 will be described in the present embodiment.

Figure 41:
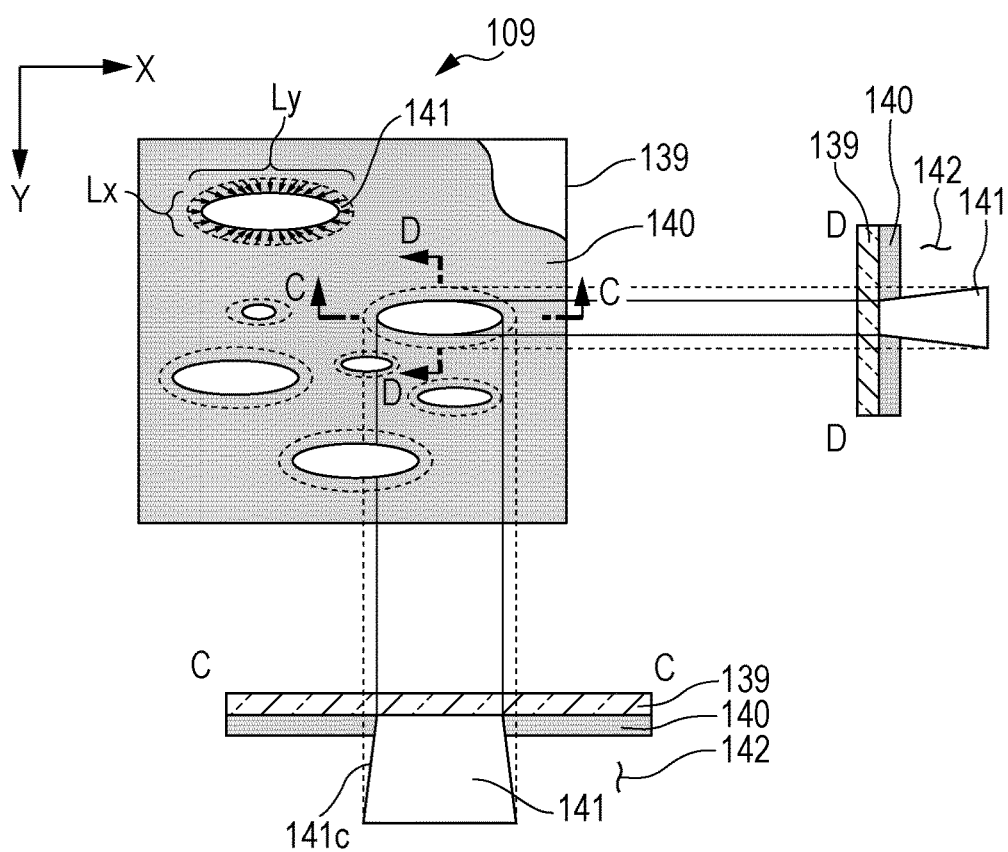
FIG. 41 is a plan view of a light diffusion member according to a ninth embodiment.

FIG. 41 is a schematic diagram of the light diffusion member 109. The upper left part of FIG. 41 is a plan view of the light diffusion member 109. The lower left part is a cross-sectional diagram taken along line C-C in the plan view to the upper left part. The upper right part is a cross-sectional diagram taken along line D-D in the plan view to the upper left part.

The light diffusion member 109 according to the present embodiment has multiple light diffusion portions 141 provided, scattered throughout a substrate 139, as illustrated in the upper left part in FIG. 41. The light diffusion portions 141 are slender ovals in planar shape as viewed from the normal direction of the substrate 139. The light diffusion portions 141 each have a major axis and a minor axis.

The major axis directions of the light diffusion portions 141 are generally arranged in the X direction. The minor axis directions of the light diffusion portions 141 are generally arranged in the Y direction. Accordingly, taking the orientation of reflecting faces 141c of the light diffusion portions 141 into consideration, the percentage of the reflecting faces 141c following the X direction is greater than the percentage of the reflecting faces 141c following the Y direction in the reflecting faces 141c of the light diffusion portions 141. Thus, the amount of light Ly reflecting off of the reflecting face 141c following the X direction and diffusing in the Y direction is greater than the amount of light Lx reflecting off of the reflecting face 141c following the Y direction and diffusing in the X direction. Accordingly, the azimuthal direction where the diffusion at the light diffusion member 109 is the strongest is the Y direction, which is the minor axis direction of the light diffusion portions 141.

The light diffusion member 109 is disposed on the light-emitting side of the liquid crystal panel 2 in the present embodiment, and further, the azimuthal angle direction where the transmissivity change in polar angle is largest in a case where a constant voltage is applied to the liquid crystal panel 2 of the light diffusion member 109 (azimuthal angle $\phi$: 90°-270° direction), and the azimuthal angle direction where the dispersion of the light diffusion member 109 is the strongest (Y direction, which is the minor axis direction of the light diffusion portions 141) and are generally matched.

Figure 42:
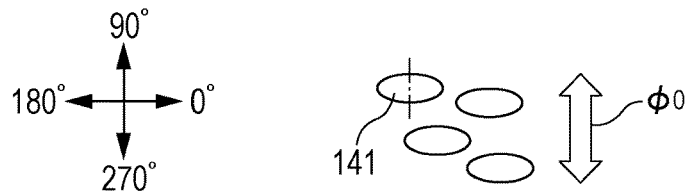
FIG. 42 is a diagram for describing a placement configuration of light diffusion portions as to a strong scattering azimuth in the ninth embodiment.

FIG. 42 is a diagram for describing a placement configuration of the light diffusion portions 141 as to a strong scattering azimuth in the present embodiment. Only part of the multiple light diffusion portions 141 are illustrated in FIG. 42, for the sake of convenience.

In a case where the planar shape of the light diffusion portion 141 is elliptical, the horizontal shapes of the ellipse are equal across the minor axis as an axis of symmetry, since ellipses have biaxial symmetry. Accordingly, scattering properties are horizontally symmetrical across the strong scattering azimuth $\phi_0$ as the axis. Thus, the direction parallel with the minor axis is the strong scattering azimuth $\phi_0$ in the light diffusion portions 141 where the planar shape is an ellipse.

The light diffusion portion 141 according to the present embodiment has a major axis orthogonal to the center axis where the strong scattering azimuth $\phi_0$ is the center axis. The major axes of the multiple light diffusion portions 141 in the light diffusion member 109 according to the present embodiment are aligned in the same direction.

Note that the major axes of the multiple light diffusion portions 141 do not each need to be arrayed completely aligned in the same direction; generally matching will suffice.

Accordingly, a light diffusion member which can maintain a horizontal symmetry of viewing angle while broadening the viewing angle can be provided by the present embodiment as well. Also, the same advantage as the first embodiment, which is that a liquid crystal display device with excellent display quality can be provided, is realized.

Also, description has been made by way of an example where the multiple light diffusion portions 141 are configured using light diffusion portions 141 that are elliptic in plan view, but this is not restrictive. For example, the multiple light diffusion portions may include shapes where the planar shapes are circular, polygonal, half-circle, and so forth. Light diffusion portions of such shapes may be included as long as the scattering intensity at azimuth $\phi_0+\Delta\phi$ and the scattering intensity at azimuth $\phi_0-\Delta\phi$ are generally equal across strong scattering azimuth $\phi_0$ as the center axis in the light diffusion member, so that the horizontal symmetry of viewing angle can be maintained at the light diffusion member. It is sufficient that the luminance distribution of the liquid crystal panel being generally line-symmetrical at the liquid crystal display device.

Tenth Embodiment

A tenth embodiment of the present invention will be described with reference to FIG. 43.

Figure 43:
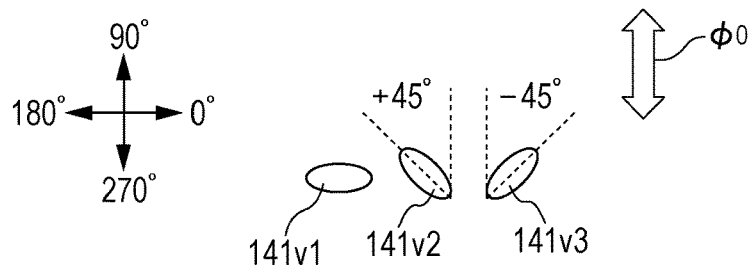
FIG. 43 is a diagram for describing a placement configuration of light diffusion portions as to a strong scattering azimuth in a tenth embodiment.

FIG. 43 is a diagram for describing a placement configuration of light diffusion portions as to a strong scattering azimuth $\phi_0$ in the tenth embodiment. Only part of the multiple light diffusion portions are illustrated in FIG. 43, for the sake of convenience.

As illustrated in FIG. 43, the basic configuration of the present embodiment is the same as that of the ninth embodiment, and differs from the first embodiment with regard to the point that the multiple light diffusion portions include multiple first light diffusion portions 141v1 having a major axis orthogonal to the strong scattering azimuth $\phi_0$ (center axis), second light diffusion portions 141v2 having a major axis at +45° to the strong scattering azimuth $\phi_0$, and third light diffusion portions 141v3 having a major axis at −45° to the strong scattering azimuth $\phi_0$, the shape and size of the second light diffusion portions 141v2 and the shape and size of the third light diffusion portions 141v2 being the same, and the number of the second light diffusion portions 141v2 and the third light diffusion portions 141v3 being the same.

Components in FIG. 43 which are the same as components in the drawings used in the ninth embodiment are denoted with the same reference numerals, and detailed description thereof will be omitted.

The presence ratio of the light diffusion portions according to the present embodiment per unit area is N1:N2:N3=2:1:1, where the number of first light diffusion portions 141v1: number of second light diffusion portions 141v2: number of third light diffusion portions 141v3=N1:N2:N3.

A light diffusion member which can maintain a horizontal symmetry of viewing angle while broadening the viewing angle can be provided by the present embodiment as well. Also, the same advantage as the ninth embodiment, which is that a liquid crystal display device with excellent display quality can be provided, is realized.

Further, the present embodiment has light diffusion portions which have angles of opposite signs with regard to the angle of the major axes of the light diffusion portions as to the strong scattering azimuth $\phi_0$. Accordingly, the difference in scattering intensity among each azimuthal angle is reduced in the light diffusion member according to the present embodiment, in comparison with the light diffusion member 109 according to the ninth embodiment. Accordingly, the difference in scattering intensity among each azimuthal angle is reduced in the liquid crystal display device according to the present embodiment, in comparison with the liquid crystal display device according to the ninth embodiment. Thus, the degree of change in luminance in the azimuthal angle direction can be reduced, and visual recognition can be improved.

While description of the present embodiment has been made by way of multiple second light diffusion portions 141v2 having a major axis at +45° to the strong scattering azimuth $\phi_0$, and multiple third light diffusion portions 141v3 having a major axis at −45° to the strong scattering azimuth $\phi_0$, this is not restrictive. The angles of the major axes of the second light diffusion portions and the third light diffusion portions as to the strong scattering azimuth $\phi_0$ may be different from these angles. For example, multiple second light diffusion portions having a major axis at +30° to the strong scattering azimuth $\phi_0$ and multiple third light diffusion portions having a major axis at −30° to the strong scattering azimuth $\phi_0$ may be employed. That is to say, it is sufficient for the multiple light diffusion portions to include multiple first light diffusion portions having a major axis orthogonal to the strong scattering azimuth $\phi_0$, multiple second light diffusion portions having a major axis at an angle of +α to the strong scattering azimuth $\phi_0$, and multiple third light diffusion portions having a major axis at an angle of −α to the strong scattering azimuth $\phi_0$.

While description of the present embodiment has been made by way of an example where the shape and size of the second light diffusion portions 141v2 and the shape and size of the multiple third light diffusion portions 141v2 are the same and the number of the second light diffusion portions 141v2 and the number of the third light diffusion portions 141v3 are the same in the present embodiment, this is not restrictive. The shape and size of the second light diffusion portions and the shape and size of the third light diffusion portions may each be slightly different. Also, the presence ratio of the light diffusion portions is not restricted to 2:1:1. For example, the presence ratio of the light diffusion portions may be 1:2:2, or 3:1:1. It is sufficient for the shape and size of the second light diffusion portions and the shape and size of the third light diffusion portions to be generally the same, and the number of the second light diffusion portions and the number of the third light diffusion portions generally the same, so that horizontal direction symmetry of the viewing angle can be maintained even with such differences.

Eleventh Embodiment

An eleventh embodiment of the present invention will be described with reference to FIG. 44.

Figure 44:
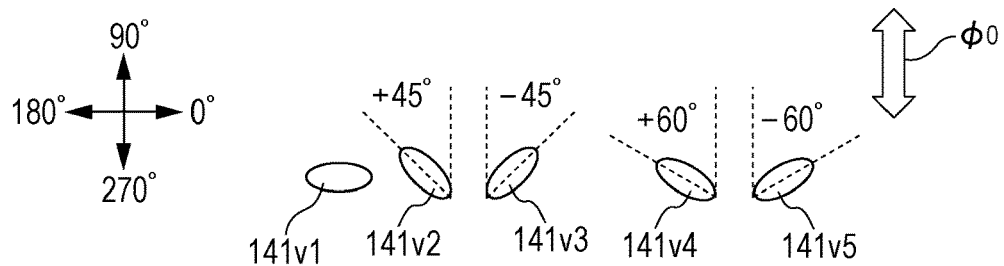
FIG. 44 is a diagram for describing a placement configuration of a light diffusion portions as to a strong scattering azimuth in an eleventh embodiment.

FIG. 44 is a diagram for describing a placement configuration of light diffusion portions as to a strong scattering azimuth $\phi_0$ in the eleventh embodiment. Only part of the multiple light diffusion portions are illustrated in FIG. 44, for the sake of convenience.

As illustrated in FIG. 44, the basic configuration of the present embodiment is the same as that of the ninth embodiment, and differs from the ninth embodiment with regard to the point that the multiple light diffusion portions include multiple first light diffusion portions 141v1 having a major axis orthogonal to the strong scattering azimuth $\phi_0$ (center axis), second light diffusion portions 141v2 having a major axis at +45° to the strong scattering azimuth $\phi_0$, third light diffusion portions 141v3 having a major axis at −45° to the strong scattering azimuth $\phi_0$, fourth light diffusion portions 141v4 having a major axis at +60° to the strong scattering azimuth $\phi_0$, and fifth light diffusion portions 141v5 having a major axis at −60° to the strong scattering azimuth $\phi_0$. The shape and size of the second light diffusion portions 141v2 and the shape and size of the third light diffusion portions 141v3 are the same, and shape and size of the fourth light diffusion portions 141v4 and the shape and size of the fifth light diffusion portions 141v5 are the same. The number of the second light diffusion portions 141v2 and the third light diffusion portions 141v3 are the same, and the number of the fourth light diffusion portions 141v4 and the fifth light diffusion portions 141v5 are the same.

Components in FIG. 44 which are the same as components in the drawings used in the ninth embodiment are denoted with the same reference numerals, and detailed description thereof will be omitted.

The presence ratio of the light diffusion portions according to the present embodiment is N1:N2:N3:N4:N5=5:2:2:1:1, where the number of first light diffusion portions 141v1: number of second light diffusion portions 141v2: number of third light diffusion portions 141v3: number of fourth light diffusion portions 141v4: number of fifth light diffusion portions 141v5=N1:N2:N3:N4:N5.

A light diffusion member which can maintain a horizontal symmetry of viewing angle while broadening the viewing angle can be provided by the present embodiment as well. Also, the same advantage as the ninth embodiment, which is that a liquid crystal display device with excellent display quality can be provided, is realized.

Further, in comparison with the tenth embodiment, the present embodiment has a greater number of types of light diffusion portions which have angles of opposite signs with regard to the angle of the major axes of the light diffusion portions as to the strong scattering azimuth $\phi_0$. Accordingly, the difference in scattering intensity among each azimuthal angle is reduced in the light diffusion member according to the present embodiment, in comparison with the light diffusion member according to the tenth embodiment. Accordingly, the difference in scattering intensity among each azimuthal angle is reduced in the liquid crystal display device according to the present embodiment, in comparison with the liquid crystal display device according to the tenth embodiment. Thus, the degree of change in luminance in the azimuthal angle direction can be reduced, and visual recognition can be improved.

While description of the present embodiment has been made by way of multiple second light diffusion portions 141v2 having a major axis at +45° to the strong scattering azimuth $\phi_0$, multiple third light diffusion portions 141v3 having a major axis at −45° to the strong scattering azimuth $\phi_0$, multiple fourth light diffusion portions 141v4 having a major axis at +60° to the strong scattering azimuth $\phi_0$, and multiple fifth light diffusion portions 141v5 having a major axis at −60° to the strong scattering azimuth $\phi_0$, this is not restrictive. The angles of the major axes of the second light diffusion portions through fifth light diffusion portions as to the strong scattering azimuth $\phi_0$ may be different from these angles. For example, multiple second light diffusion portions having a major axis at +30° to the strong scattering azimuth $\phi_0$, multiple third light diffusion portions having a major axis at −30° to the strong scattering azimuth $\phi_0$, multiple fourth light diffusion portions having a major axis at +75° to the strong scattering azimuth $\phi_0$, and multiple fifth light diffusion portions having a major axis at −75° to the strong scattering azimuth $\phi_0$, may be employed. That is to say, it is sufficient that the multiple light diffusion portions include multiple first light diffusion portions having a major axis orthogonal to the strong scattering azimuth $\phi_0$, multiple second light diffusion portions having a major axis at an angle of +α to the strong scattering azimuth $\phi_0$, multiple third light diffusion portions having a major axis at an angle of −α to the strong scattering azimuth $\phi_0$, multiple fourth light diffusion portions having a major axis at an angle of −β to the strong scattering azimuth $\phi_0$, multiple fifth light diffusion portions having a major axis at an angle of −β to the strong scattering azimuth $\phi_0$.

While description of the present embodiment has been made by way of four types of light diffusion portions (second light diffusion portion through fifth light diffusion portion) which have angles of opposite signs with regard to the angle of the major axes of the light diffusion portions as to the strong scattering azimuth $\phi_0$, this is not restrictive. For example, five or more types of multiple types of light diffusion portions may be used which have angles of opposite signs with regard to the angle of the major axes of the light diffusion portions as to the strong scattering azimuth $\phi_0$.

While description of the present embodiment has been made by way of an example where the shape and size of the second light diffusion portions 141v2 and the shape and size of the multiple third light diffusion portions 141v3 are the same, and the shape and size of the fourth light diffusion portions 141v4 and the shape and size of the multiple fifth light diffusion portions 141v5 are the same, this is not restrictive. The shape and size of the second light diffusion portions and the shape and size of the third light diffusion portions may each be slightly different, and the shape and size of the fourth light diffusion portions and the shape and size of the fifth light diffusion portions may each be slightly different. Also, the presence ratio of the light diffusion portions is not restricted to 5:2:2:1:1. For example, the presence ratio of the light diffusion portions may be 4:3:3: 1:1, or 3:1:1:2:2. It is sufficient for the shape and size of the second light diffusion portions and the shape and size of the third light diffusion portions to be generally the same and the shape and size of the fourth light diffusion portions and the shape and size of the fifth light diffusion portions to be generally the same, and the number of the second light diffusion portions and the number of the third light diffusion portions generally the same and the number of the fourth light diffusion portions and the number of the fifth light diffusion portions generally the same, so that horizontal direction symmetry of the viewing angle can be maintained even with such differences.

Twelfth Embodiment

A twelfth embodiment of the present invention will be described with reference to FIG. 45.

Figure 45:
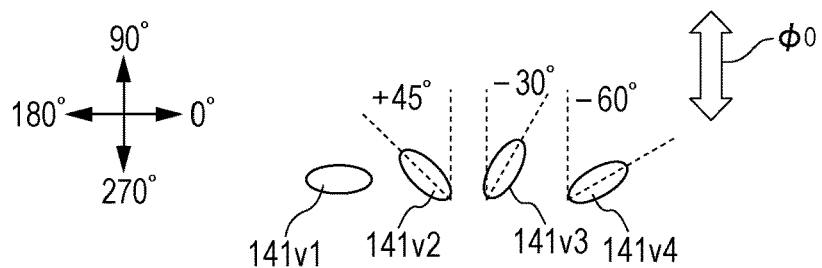
FIG. 45 is a diagram for describing a placement configuration of light diffusion portions as to a strong scattering azimuth in a twelfth embodiment.

FIG. 45 is a diagram for describing a placement configuration of light diffusion portions as to a strong scattering azimuth $\phi_0$ in the twelfth embodiment. Only part of the multiple light diffusion portions are illustrated in FIG. 45, for the sake of convenience.

As illustrated in FIG. 45, the basic configuration of the present embodiment is the same as that of the first embodiment, and differs from the ninth embodiment with regard to the point that the multiple light diffusion portions include multiple first light diffusion portions 141v1 having a major axis orthogonal to the strong scattering azimuth $\phi_0$ (center axis), second light diffusion portions 141v2 having a major axis at +45° to the strong scattering azimuth $\phi_0$, third light diffusion portions 141v3 having a major axis at −30° to the strong scattering azimuth $\phi_0$, and fourth light diffusion portions 141v4 having a major axis at −60° to the strong scattering azimuth $\phi_0$. The shape and size of the second light diffusion portions 141v2, the shape and size of the third light diffusion portions 141v3, and the shape and size of the fourth light diffusion portions 141v4, are the same. The number of the second light diffusion portions 141v2, and the total of the number of the third light diffusion portions 141v3 and the number of the fourth light diffusion portions 141v4 are the same.

Components in FIG. 45 which are the same as components in the drawings used in the ninth embodiment are denoted with the same reference numerals, and detailed description thereof will be omitted.

The presence ratio of the light diffusion portions according to the present embodiment is N1:N2:N3:N4=4:2:1:1, where the number of first light diffusion portions 141v1: number of second light diffusion portions 141v2: number of third light diffusion portions 141v3: number of fourth light diffusion portions 141v4=N1:N2:N3:N4.

A light diffusion member which can maintain a horizontal symmetry of viewing angle while broadening the viewing angle can be provided by the present embodiment as well. Also, the same advantage as the ninth embodiment, which is that a liquid crystal display device with excellent display quality can be provided, is realized.

Further, light diffusion portions which have different angles of opposite signs with regard to the angle of the major axes of the light diffusion portions as to the strong scattering azimuth $\phi_0$. Although the placement patterns of the light diffusion portions are different at the right and the left, half each of the third light diffusion portions 141v3 having a major axis at −30° to the strong scattering azimuth $\phi_0$, and fourth light diffusion portions 141v4 having a major axis at −60° to the strong scattering azimuth $\phi_0$ exist as to the number of the second light diffusion portions 141v2 having a major axis at +45° to the strong scattering azimuth $\phi_0$, so the horizontal balance is generally maintained. Accordingly, the difference in scattering intensity among each azimuthal angle can be reduced in the light diffusion member according to the present embodiment, in comparison with the light diffusion member 109 according to the ninth embodiment. Accordingly, the difference in scattering intensity among each azimuthal angle can be reduced in the liquid crystal display device according to the present embodiment, in comparison with the liquid crystal display device 1 according to the present embodiment. Thus, the degree of change in luminance in the azimuthal angle direction can be reduced, and visual recognition can be improved.

While description of the present embodiment has been made by way of multiple second light diffusion portions 141v2 having a major axis at +45° to the strong scattering azimuth $\phi_0$, multiple third light diffusion portions 141v3 having a major axis at −30° to the strong scattering azimuth $\phi_0$, and multiple fourth light diffusion portions 141v4 having a major axis at −60° to the strong scattering azimuth $\phi_0$, this is not restrictive. The angles of the major axes of the second light diffusion portions through fourth light diffusion portions as to the strong scattering azimuth $\phi_0$ may be different from these angles. For example, multiple second light diffusion portions having a major axis at +30° to the strong scattering azimuth $\phi_0$, multiple third light diffusion portions having a major axis at −15° to the strong scattering azimuth $\phi_0$, and multiple fourth light diffusion portions having a major axis at −45° to the strong scattering azimuth $\phi_0$, may be employed. That is to say, it is sufficient for the multiple light diffusion portions to include multiple first light diffusion portions having a major axis orthogonal to the strong scattering azimuth $\phi_0$, multiple second light diffusion portions having a major axis at an angle of +α to the strong scattering azimuth $\phi_0$, multiple third light diffusion portions having a major axis at an angle of −β to the strong scattering azimuth $\phi_0$, and multiple fourth light diffusion portions having a major axis at an angle of −γ to the strong scattering azimuth $\phi_0$, with α satisfying the relationship of α=(β+γ)/2.

While description of the present embodiment has been made by way of an example where the shape and size of the second light diffusion portions 141v2, the shape and size of the multiple third light diffusion portions 141v3 are the same, and the shape and size of the fourth light diffusion portions 141v4 are the same, this is not restrictive. The shape and size of the second light diffusion portions, the shape and size of the third light diffusion portions, and the shape and size of the fourth light diffusion portions, may each be slightly different. Also, the presence ratio of the light diffusion portions is not restricted to 4:2:1:1. For example, the presence ratio of the light diffusion portions may be 4:3:1:1, or 3:1:2:2. It is sufficient for the shape and size of the second light diffusion portions, the shape and size of the third light diffusion portions, and the shape and size of the fourth light diffusion portions, to be generally the same, and the number of the second light diffusion portions, and the total of the number of the third light diffusion portions and the number of the fourth light diffusion portions, generally the same, so that horizontal direction symmetry of the viewing angle can be maintained even with such differences.

Thirteenth Embodiment

A thirteenth embodiment of the present invention will be described with reference to FIG. 46.

Figure 46:
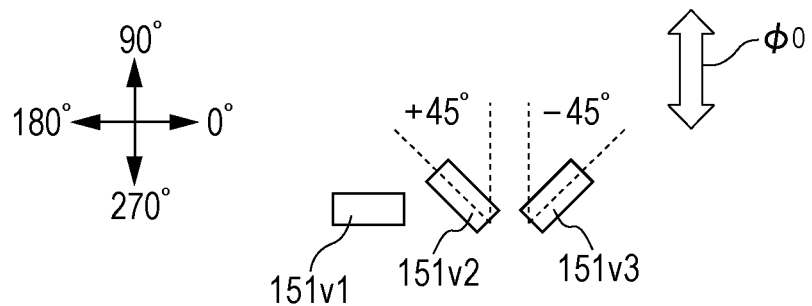
FIG. 46 is a diagram for describing a placement configuration of light diffusion portions as to a strong scattering azimuth in a thirteenth embodiment.

FIG. 46 is a diagram for describing a placement configuration of light diffusion portions as to a strong scattering azimuth $\phi_0$ in the thirteenth embodiment. Only part of the multiple light diffusion portions are illustrated in FIG. 46, for the sake of convenience.

As illustrated in FIG. 46, the basic configuration of the present embodiment is the same as that of the tenth embodiment, and differs from the tenth embodiment with regard to the point that the planar shape of the light diffusion portions (first light diffusion portion 151v1, second light diffusion portion 151v2, and third light diffusion portion 151v3) is rectangular.

Components in FIG. 46 which are the same as components in the drawings used in the tenth embodiment are denoted with the same reference numerals, and detailed description thereof will be omitted.

The presence ratio of the light diffusion portions according to the present embodiment is N1:N2:N3=5:2:2, where the number of first light diffusion portions 151v1: number of second light diffusion portions 151v2: number of third light diffusion portions 151v3=N1:N2:N3.

A light diffusion member which can maintain a horizontal symmetry of viewing angle while broadening the viewing angle can be provided by the present embodiment as well. Also, a liquid crystal display device with excellent display quality can be provided. Further, advantages the same as those of the tenth embodiment, that the degree of change in luminance in the azimuthal angle direction can be reduced and visual recognition can be improved, can be realized.

The presence ratio of the light diffusion portions is not restricted to 5:2:2 in the present embodiment. For example, the presence ratio of the light diffusion portions may be 1:2:2, or 3:1:1. It is sufficient for the number of the second light diffusion portions and the number of the third light diffusion portions to be generally the same, so that horizontal direction symmetry of the viewing angle can be maintained even with such differences.

Fourteenth Embodiment

A fourteenth embodiment of the present invention will be described with reference to FIG. 47.

Figure 47:
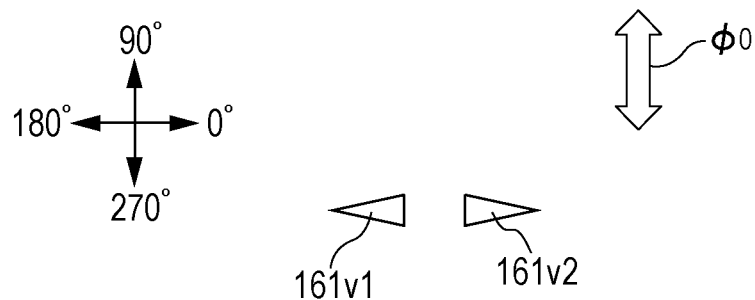
FIG. 47 is a diagram for describing a placement configuration of light diffusion portions as to a strong scattering azimuth in a fourteenth embodiment.

FIG. 47 is a diagram for describing a placement configuration of light diffusion portions as to a strong scattering azimuth $\phi_0$ in the fourteenth embodiment of the present invention. Only part of the multiple light diffusion portions are illustrated in FIG. 47, for the sake of convenience.

As illustrated in FIG. 47, the basic configuration of the present embodiment is the same as that of the ninth embodiment, and differs from the ninth embodiment with regard to the point that the multiple light diffusion portions include multiple first light diffusion portions 161v1 which are light diffusion portion that have a shape in planar view of isosceles triangles having a major axis orthogonal to the strong scattering azimuth $\phi_0$ (center axis) and multiple second light diffusion portions 161v2 which are light diffusion portion that have a shape in planar view of isosceles triangles having a major axis orthogonal to the strong scattering azimuth $\phi_0$, and facing in the opposite direction as to the first light diffusion portions 161v1, the number of the first light diffusion portions 161v1 and the number of the second light diffusion portions 161v2 being the same.

Components in FIG. 47 which are the same as components in the drawings used in the ninth embodiment are denoted with the same reference numerals, and detailed description thereof will be omitted.

The presence ratio of the light diffusion portions according to the present embodiment is N1:N2=1:1, where the number of first light diffusion portions $161v1$: number of second light diffusion portions $161v2$=N1:N2.

The planar shapes of the light diffusion portion are only uniaxially symmetrical in the present embodiment, but the same numbers facing in opposite directions are laid out, so the horizontal balance is generally maintained. Accordingly, a light diffusion member which can maintain a horizontal symmetry of viewing angle while broadening the viewing angle can be provided by the present embodiment as well. Also, the same advantage as the ninth embodiment, which is that a liquid crystal display device with excellent display quality can be provided, is realized.

Note that the presence ratio of the light diffusion portions is not restricted to 1:1 in the present embodiment. For example, the presence ratio of the light diffusion portions may be 100:99, or 99:100. It is sufficient for the number of the first light diffusion portions and the number of the second light diffusion portions to be generally the same, so that horizontal direction symmetry of the viewing angle can be maintained even with such differences.

Fifteenth Embodiment

A fifteenth embodiment of the present invention will be described with reference to FIG. 48.

Figure 48:
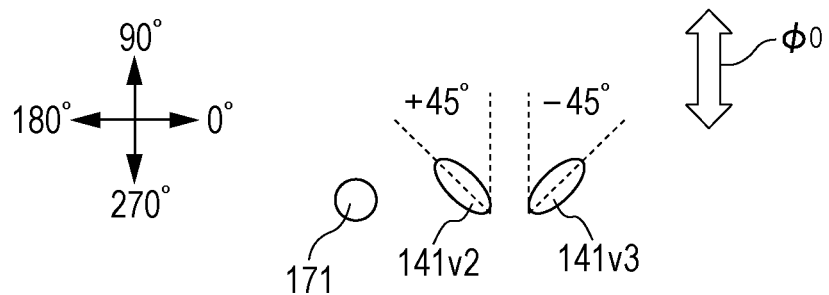
FIG. 48 is a diagram for describing a placement configuration of light diffusion portions as to a strong scattering azimuth in a fifteenth embodiment.

FIG. 48 is a diagram for describing a placement configuration of light diffusion portions as to a strong scattering azimuth $\phi_0$ in the fifteenth embodiment. Only part of the multiple light diffusion portions are illustrated in FIG. 48, for the sake of convenience.

As illustrated in FIG. 48, the basic configuration of the present embodiment is the same as that of the ninth embodiment, and differs from the ninth embodiment with regard to the point that the multiple light diffusion portions include multiple first light diffusion portions 171$v1$ where the shapes of the light diffusion portions in planar view are circular, second light diffusion portions 141$v2$ having a major axis at +45° to the strong scattering azimuth $\phi_0$ (center axis), and third light diffusion portions 141$v3$ having a major axis at −45° to the strong scattering azimuth $\phi_0$, the shape and size of the second light diffusion portions 141$v2$ and the shape and size of the third light diffusion portions 141$v3$ being the same, and the number of the second light diffusion portions 141$v2$ and the third light diffusion portions 141$v3$ being generally the same.

Components in FIG. 48 which are the same as components in the drawings used in the ninth embodiment are denoted with the same reference numerals, and detailed description thereof will be omitted.

The presence ratio of the light diffusion portions according to the present embodiment is N1:N2:N3=2:1:1, where the number of first light diffusion portions 171: number of second light diffusion portions 141$v2$: number of third light diffusion portions 141$v3$=N1:N2:N3.

A light diffusion member which can maintain a horizontal symmetry of viewing angle while broadening the viewing angle can be provided by the present embodiment as well. Also, a liquid crystal display device with excellent display quality can be provided. Further, the same advantage as the tenth embodiment, which is that the degree of change in luminance in the azimuthal angle direction can be reduced, and visual recognition can be improved, is realized.

While description of the present embodiment has been made by way of multiple second light diffusion portions 141$v2$ having a major axis at +45° to the strong scattering azimuth $\phi_0$, and multiple third light diffusion portions 141$v3$ having a major axis at −45° to the strong scattering azimuth $\phi_0$, this is not restrictive. The angles of the major axes of the second light diffusion portions and the third light diffusion portions as to the strong scattering azimuth $\phi_0$ may be different from these angles. For example, multiple second light diffusion portions having a major axis at +30° to the strong scattering azimuth $\phi_0$ and multiple third light diffusion portions having a major axis at −30° to the strong scattering azimuth $\phi_0$ may be employed. That is to say, it is sufficient for the light diffusion portions to include multiple first light diffusion portions circular in planar view, multiple second light diffusion portions having a major axis at an angle of +α to the strong scattering azimuth $\phi_0$, and multiple third light diffusion portions having a major axis at an angle of −α to the strong scattering azimuth $\phi_0$.

While description of the present embodiment has been made by way of an example where the shape and size of the second light diffusion portions 141$v2$ and the shape and size of the multiple third light diffusion portions 141$v2$ are the same, this is not restrictive.

The shape and size of the second light diffusion portions and the shape and size of the third light diffusion portions may each be slightly different. Also, the presence ratio of the light diffusion portions is not restricted to 2:1:1. For example, the presence ratio of the light diffusion portions may be 1:2:2, or 3:1:1. It is sufficient for the shape and size of the second light diffusion portions and the shape and size of the third light diffusion portions to be generally the same, and the number of the second light diffusion portions and the number of the third light diffusion portions generally the same, so that horizontal direction symmetry of the viewing angle can be maintained even with such differences.

Sixteenth Embodiment

A sixteenth embodiment of the present invention will be described with reference to FIG. 49A through FIG. 49D.

The basic configuration of the present embodiment is the same as that of the ninth embodiment, and differs from the ninth embodiment with regard to the shape of the light diffusion portion of the light diffusion member.

Accordingly, description of components the same as those in the drawings reference in the ninth embodiment will be omitted, and the light diffusion portions will be described.

FIG. 49A through FIG. 49D are plan views of light diffusion portions according to the present embodiment.

The shapes of the light diffusion portions according to the present embodiment are anisotropic shapes having a major axis and minor axis, and having biaxial symmetry, as illustrated in FIG. 49A through FIG. 49D.

Figure 49A:
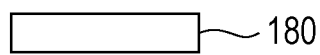
FIG. 49A is a plan view of a light diffusion portion according to a sixteenth embodiment.
Figure 49B:
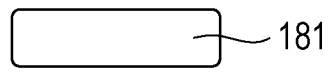
FIG. 49B is a plan view of a light diffusion portion according to the sixteenth embodiment.
Figure 49C:
FIG. 49C is a plan view of a light diffusion portion according to the sixteenth embodiment.

Specifically, the shape of a light diffusion portion 180 illustrated in FIG. 49A is a rectangle. The shape of a light diffusion portion 181 illustrated in FIG. 49B is a shape where the corners of a rectangle have been rounded. The shape of a light diffusion portion 182 illustrated in FIG. 49C is a shape where the corners of a rectangle have been rounded further (slot shaped).

Figure 49D:
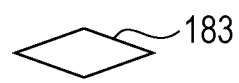
FIG. 49D is a plan view of a light diffusion portion according to the sixteenth embodiment.

The shape of a light diffusion portion 183 illustrated in FIG. 49D is a rhombus.

The major axes of the light diffusion portions 180 through 183 are orthogonal to the strong scattering azimuth $\phi_0$ (center axis) in the present embodiment.

Accordingly, a light diffusion member which can maintain a horizontal symmetry of viewing angle while broadening the viewing angle can be provided by the present embodiment as well. Also, the same advantage as the ninth embodiment, which is that a liquid crystal display device with excellent display quality can be provided, is realized.

Note that the technical scope of the present invention is not restricted to the above-described embodiments, and that various modifications may be made without departing from the essence of the present invention. For example, although the above embodiments have been described by way of an example of a liquid crystal device serving as the display, this is not restrictive, and the present invention may be applied to organic electro-luminescence display devices, plasma displays, and so forth.

Also, at least one of an anti-reflection layer, a polarization filter layer, an anti-static layer, and anti-glare processing layer, and an anti-fouling processing layer may be provided on the viewing side of the substrate of the light diffusion member according to the present embodiment. According to this configuration, functions of reducing reflection of external light, functions of preventing dust and contaminants from adhering, functions of preventing scratching, and so forth, can be added in accordance with the type of layer provided on the viewing side of the substrate, thereby preventing deterioration of viewing angle properties over time.

Other specific configurations relating to the materials, number, placement, and so forth, of the components of the liquid crystal display device, are not restricted to the above-described embodiments, and may be changed as appropriate. For example, while an example has been illustrated in the above embodiments where polarizing plates and phase difference plates are disposed on the outer side of the liquid crystal panel, a configuration may be made instead where a polarizing layer and phase difference layer are formed on the inner side of the pair of substrates making up the liquid crystal panel.

INDUSTRIAL APPLICABILITY

The present invention is applicable to various types of display devices, such as liquid crystal display devices, organic electro-luminescence display devices, plasma displays, and so forth.

REFERENCE SIGNS LIST 1 liquid crystal display device
2 liquid crystal panel (display)
9, 109 light diffusion member
10 TFT substrate (substrate)
11 liquid crystal layer
12 color filter substrate (substrate)
39, 139 substrate
40, 70, 80, 81, 82, 83, 140 light shielding layer
40$v$1, 50$v$1, 60$v$1 first light shielding layer
40$v$2, 50$v$2, 60$v$2 second light shielding layer
40$v$3, 50$v$3 third light shielding layer
40$v$4 fourth light shielding layer
40$v$5 fifth light shielding layer
41, 171, 141 light diffusion portion
141$v$1, 151$v$1, 161$v$1 first light diffusion portion
141$v$2, 151$v$2, 161$v$2 second light diffusion portion
141$v$3, 151$v$3 third light diffusion portion
141$v$4 fourth light diffusion portion
141$v$5 fifth light diffusion portion
41$a$ light-emitting end surface
41$b$ light incident end surface
41$c$, 141$c$ reflecting face
θ polar angle
φ azimuthal angle
$\phi_0$ strong scattering azimuth

The invention claimed is:

1. A light diffusion member comprising:
a substrate having light transmissivity;
a plurality of light shielding layers on one face of the substrate; and
a light diffusion portion on the one face of the substrate at a first region other than a second region where the plurality of light shielding layers have been provided, wherein
the light diffusion portion includes:
a light-emitting end surface in contact with the substrate,
a light incident end surface which faces the light-emitting end surface and has a first area that is larger than a second area of the light-emitting end surface, and
a reflecting face in contact with the light-emitting end surface and the light incident end surface, and reflecting light entering from the light incident end surface,
a distance from the light incident end surface to the light-emitting end surface is greater than a thickness of the plurality of light shielding layers,
a first scattering intensity at an azimuth $\phi_0+\Delta\phi$ and a second scattering intensity at an azimuth $\phi_0-\Delta\phi$ across a strong scattering azimuth $\phi_0$ as a center axis are equal,
the plurality of light shielding layers include:
a plurality of first light shielding layers having a first major axis orthogonal to the center axis,
a plurality of second light shielding layers having a second major axis with a first angle with respect to the center axis, the plurality of second light shielding layers being different from the plurality of first light shielding layers, and
a plurality of third light shielding layers having a third major axis with a second angle with respect to the center axis, the plurality of third light shielding layers being different from the plurality of first light shielding layers and the plurality of second light shielding layers,
the first angle is greater than 0°, and is less than 90°,
the second angle is greater than −90°, and is less than 0°,
a first shape and a first size of the plurality of second light shielding layers is the same as a second shape and a second size of the plurality of third light shielding layers, and
a first number of the plurality of second light shielding layers is equal to a second number of the plurality of third light shielding layers.

2. The light diffusion member according to claim 1, wherein
the plurality of light shielding layers further include:
a plurality of fourth light shielding layers having a fourth major axis with a third angle of +β with respect to the center axis, and
a plurality of fifth light shielding layers having a fifth major axis with a fourth angle of −β with respect to the center axis,
a third shape and a third size of the plurality of fourth light shielding layers is the same as a fourth shape and fourth size of the fifth light shielding layers, and
a third number of the plurality of fourth light shielding layers is equal to a fourth number of the plurality of fifth light shielding layers.

3. The light diffusion member according to claim 1, wherein
the first angle is +α and the second angle is −β, the plurality of light shielding layers further include:
a plurality of fourth light shielding layers having a fourth major axis with a third angle of $-\gamma$ with respect to the center axis,
the $\alpha$ satisfies a relationship of $\alpha=(\beta+\gamma)/2$, and
the first shape and the first size, the second shape and the second size, and a third shape and a third size of the plurality of fourth light shielding layers are the same as each other.

4. The light diffusion member according to claim 1, wherein a planar shape of the plurality of light shielding layers seen from a normal direction of the one face of the substrate is an anisotropic shape having at least a major axis and a minor axis.

5. The light diffusion member according to claim 4, wherein the planar shape has biaxial symmetry.

6. The light diffusion member according to claim 5, wherein the planar shape is one of an ellipse, a rectangle, and a rhombus.

7. The light diffusion member according to claim 1, wherein the first angle is $+\alpha$ and the second angle is $-\alpha$.

8. The light diffusion member according to claim 1, wherein
a third number of the plurality of first light shielding layers is larger than the first number, and
the third number is larger than the second number.

9. The light diffusion member according to claim 1, wherein the plurality of light shielding layers only include the first plurality of light shielding layers, the second plurality of light shielding layers, and the third plurality of light shielding layers.

10. A display device comprising:
a display; and
a viewing angle enlarging member that is disposed on a viewing side of the display and emits light in a state where an angle distribution of light input from the display is wider than before being input, wherein
the viewing angle enlarging member includes the light diffusion member according to claim 1, and
luminance distribution of the display is generally line-symmetric across a strong scattering azimuth $\phi_0$ of the light diffusion member as the center axis.

11. The display device according to claim 10, wherein the display is a liquid crystal panel including a pair of substrates, and a liquid crystal layer held between the pair of substrates.

12. The display device according to claim 11, wherein a display mode of the liquid crystal panel is one of a twisted nematic mode and a vertical alignment mode.

13. A light diffusion member comprising:
a substrate having light transmissivity;
a plurality of light diffusion portions on one face of the substrate; and
a light shielding layer on the one face of the substrate at a first region other than a second region where the plurality of light diffusion portions have been provided, wherein
each of the plurality of the light diffusion portions includes:
a light-emitting end surface in contact with the substrate,
a light incident end surface which faces the light-emitting end surface and has a first area that is larger than a second area of the light-emitting end surface, and
a reflecting face in contact with the light-emitting end surface and the light incident end surface, and reflecting light entering from the light incident end surface,
a distance from the light incident end surface to the light-emitting end surface is greater than a thickness of the light shielding layer,
a first scattering intensity at an azimuth $\phi_0+\Delta\phi$ and a second scattering intensity at an azimuth $\phi_0-\Delta\phi$ across a strong scattering azimuth $\phi_0$ as a center axis are equal,
the plurality of light diffusion portions include:
a plurality of first light diffusion portions having a first major axis orthogonal to the center axis,
a plurality of second light diffusion portions having a second major axis with a first angle with respect to the center axis, the plurality of second light diffusion portions being different from the plurality of first light diffusion portions, and
a plurality of third light diffusion portions having a third major axis with a second angle with respect to the center axis, the plurality of third light diffusion portions being different from the plurality of first light diffusion portions and the plurality of second light diffusion portions,
the first angle is greater than 0°, and is less than 90°,
the second angle is greater than −90°, and is smaller than 0°,
a first shape and a first size of the plurality of second light diffusion portions are the same as a second shape and a second size of the plurality of third light diffusion portions, and
a first number of the plurality of second light diffusion portions is equal to a second number of the plurality of third light diffusion portions.

14. The light diffusion member according to claim 13, wherein
the plurality of light diffusion portions further include:
a plurality of fourth light diffusion portions having a fourth major axis with a third angle of $+\beta$ with respect to the center axis, and
a plurality of fifth light diffusion portions having a fifth major axis with a fourth angle of $-\beta$ with respect to the center axis,
a third shape and a third size of the plurality of fourth light diffusion portions is the same as a fourth shape and a fourth size of the plurality of fifth light diffusion portions, and
a third number of the plurality of fourth light diffusion portions is equal to a fourth number of the plurality of fifth light diffusion portions.

15. The light diffusion member according to claim 13, wherein
the first angle $+\alpha$ the second angle $-\beta$,
the plurality of light diffusion portions further include:
a plurality of fourth light diffusion portions having a fourth major axis with a third angle of $-\gamma$ as to the center axis,
the $\alpha$ satisfies a relationship of $\alpha=(\beta+\gamma)/2$, and
the first shape and the first size, the second shape and the second size, and the third shape and the third size of the plurality of fourth light diffusion portions are the same.

16. The light diffusion member according to claim 13, wherein a planar shape of the plurality of light diffusion portions seen from a normal direction of the one face of the substrate is an anisotropic shape having at least a major axis and a minor axis.

17. The light diffusion member according to claim 16, wherein the planar shape has biaxial symmetry.

18. The light diffusion member according to claim 17, wherein the planar shape is one of an ellipse, a rectangle, and a rhombus.

19. The light diffusion member according to claim 13, wherein the first angle is $+\alpha$ and the second angle is $-\alpha$.

* * * * *